United States Patent
Song et al.

(10) Patent No.: US 12,186,893 B2
(45) Date of Patent: Jan. 7, 2025

(54) SOFT GRIP HEAD, SOFT GRIP UNIT HAVING THE SAME, AND GRIP DEVICE HAVING THE SOFT GRIP UNIT

(71) Applicant: KOREA INSTITUTE OF MACHINERY & MATERIALS, Daejeon (KR)

(72) Inventors: Sung-Hyuk Song, Daejeon (KR); Byung In Kim, Sejong (KR); Sung Hwi Lee, Daejeon (KR); Chan Hun Park, Daejeon (KR); Dong Il Park, Daejeon (KR); Jongwoo Park, Sejong (KR); Byoung-Kil Han, Daejeon (KR); Hyun Mok Jung, Daejeon (KR); Yongsin Seo, Daejeon (KR); Jae Young Lee, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 243 days.

(21) Appl. No.: 17/608,943

(22) PCT Filed: Jan. 13, 2021

(86) PCT No.: PCT/KR2021/000508
§ 371 (c)(1),
(2) Date: Nov. 4, 2021

(87) PCT Pub. No.: WO2021/145685
PCT Pub. Date: Jul. 22, 2021

(65) Prior Publication Data
US 2022/0314461 A1 Oct. 6, 2022

(30) Foreign Application Priority Data

Jan. 16, 2020 (KR) .......................... 10-2020-0005811
Feb. 28, 2020 (KR) .......................... 10-2020-0024948
(Continued)

(51) Int. Cl.
*B25J 15/06* (2006.01)

(52) U.S. Cl.
CPC ....... *B25J 15/0683* (2013.01); *B25J 15/0625* (2013.01)

(58) Field of Classification Search
CPC . B25J 15/0683; B25J 15/0691; B66C 1/0237; B66C 1/025; B66C 1/0287
(Continued)

(56) References Cited

U.S. PATENT DOCUMENTS 3,377,096 A * 4/1968 Wood .................... B66C 1/0231
248/363
3,920,128 A 11/1975 Baker
(Continued)

FOREIGN PATENT DOCUMENTS

CN 107972059 A 5/2018
EP 1967481 B1 * 11/2013 ............. B65G 47/91
(Continued)

OTHER PUBLICATIONS

English translation of Japanese patent JP 2015-42435 (Year: 2015).*
(Continued)

*Primary Examiner* — Dean J Kramer
(74) *Attorney, Agent, or Firm* — Hauptman Ham, LLP

(57) ABSTRACT

In a soft grip head, a soft grip unit having the soft grip head, and a grip device having the soft grip unit, the soft grip head has a suction pad and the suction pad makes contact with an object. The suction pad includes a sidewall and a plurality of (Continued)

suction cells. The sidewall divides the suction pad into a plurality of spaces, and both ends of each of the spaces are open. A plurality of suction cells is respectively formed by the spaces divided by the sidewall. The suction pad includes a material having a stiffness along an axial direction smaller than a stiffness along a width direction. The suction cells extend along the axial direction, and the width direction is substantially perpendicular to the axial direction.

16 Claims, 21 Drawing Sheets

(30) Foreign Application Priority Data

Aug. 24, 2020 (KR) .......................... 10-2020-0106250
Aug. 24, 2020 (KR) .......................... 10-2020-0106251
Aug. 24, 2020 (KR) .......................... 10-2020-0106252

(58) Field of Classification Search
USPC ......................................................... 294/188
See application file for complete search history.

(56) References Cited

U.S. PATENT DOCUMENTS

| | | | | |
|---|---|---|---|---|
| 4,557,514 A | * | 12/1985 | Cushman | B65G 47/91 269/21 |
| 5,297,830 A | * | 3/1994 | Hoke | B66C 1/025 294/65 |
| 5,464,263 A | * | 11/1995 | Hidetsugu | B66C 1/0281 294/189 |
| 7,665,783 B2 | * | 2/2010 | Nishio | H01L 21/6838 294/188 |
| 10,357,883 B1 | * | 7/2019 | O'Connor | B25J 15/0616 |
| 2015/0008690 A1 | * | 1/2015 | Kobuchi | H01L 21/6838 294/183 |

FOREIGN PATENT DOCUMENTS

| | | | | |
|---|---|---|---|---|
| FR | 2291127 A | * | 7/1976 | ............ B65G 47/91 |
| JP | H05-111882 A | | 5/1993 | |
| JP | H07-156089 A | | 6/1995 | |
| JP | -09-038883 A | | 2/1997 | |
| JP | H10-128634 A | | 5/1998 | |
| JP | H11-042583 A | | 2/1999 | |
| JP | H11-278658 A | | 10/1999 | |
| JP | 2003-142556 A | | 5/2003 | |
| JP | 2004-055833 A | | 2/2004 | |
| JP | 2006-334687 A | | 12/2006 | |
| JP | 2011-110674 A | | 6/2011 | |
| JP | 2014-200853 A | | 10/2014 | |
| JP | 2015-042435 A | | 3/2015 | |
| JP | 2018-065216 A | | 4/2018 | |
| JP | 6501458 B2 | | 4/2019 | |
| JP | 2019-135072 A | | 8/2019 | |
| KR | 10-1784780 B1 | | 10/2017 | |
| KR | 10-2019-0095162 A | | 8/2019 | |

OTHER PUBLICATIONS

Japanese Office Action issued on Mar. 28, 2023, in connection with the Japanese Patent Application No. 2022-530954, 9 pages, citing the above reference(s).
International Search Report issued on Apr. 9, 2021, for corresponding International Patent Application No. PCT/KR2021/000508.
Written Opinion issued on Apr. 9, 2021, for corresponding International Patent Application No. PCT/KR2021/000508.
The Extended European Search Report dated Feb. 14, 2024 for corresponding European Patent Application No. 21741177.6 (8 pages).

* cited by examiner

SOFT GRIP HEAD, SOFT GRIP UNIT HAVING THE SAME, AND GRIP DEVICE HAVING THE SOFT GRIP UNIT

CROSS-REFERENCE TO RELATED APPLICATION

The present application is a national stage filing under 35 U.S.C § 371 of PCT application number PCT/KR2021/000508 filed on Jan. 13, 2021 which is based upon and claims the benefit of priorities to Korean Patent Application No. 10-2020-0005811 filed on Jan. 16, 2020; Korean Patent Application No. 10-2020-0024948 filed on Feb. 28, 2020; Korean Patent Application No. 10-2020-0106251 filed on Aug. 24, 2020; Korean Patent Application No. 10-2020-0106250 filed on Aug. 24, 2020; and Korean Patent Application No. 10-2020-0106252 filed on Aug. 24, 2020, in the Korean Intellectual Property Office, which are incorporated herein in their entireties by reference.

BACKGROUND

1. Field of Disclosure

The present disclosure of invention relates to a soft grip head, a soft grip unit having the soft grip head, and a grip device having the soft grip unit, and more specifically the present disclosure of invention relates to a soft grip head, a soft grip unit having the soft grip head, and a grip device having the soft grip unit, capable of improving gripping an obstacle.

2. Description of Related Technology

A vacuum gripper uses a negative pressure applied by a vacuum pump, to absorb and grip an obstacle. Generally, the vacuum gripper is normally equipped to a transferring device for transferring a product.

In the vacuum gripper, a single vacuum pad or a plurality of vacuum pads may be used according to a size of the obstacle to be gripped.

When the single vacuum pad is used, the obstacle having an opening which is formed through the obstacle and formed in an area covered by the vacuum pad is hard to be gripped since a gripping force is less generated. Here, to solve the above problem, the vacuum pad having relatively smaller size is used to evade the opening of the obstacle, but the area in which the vacuum pad is attached decreases and thus the gripping force may be decreased.

In addition, when the obstacle gripped has a curved shape, the vacuum pad having increased flexibility may be used for gripping a curved shape of the obstacle more effectively. However, in this case, a border line of the vacuum pad may be curled inside of the vacuum pad. Thus, to solve the above problem, an additional structure such as a guide inserted into the border line of the vacuum pad, may be necessary.

Alternatively, when the plurality of vacuum pads is used, a space may be formed between the vacuum pads adjacent to each other, and thus an entire attaching area may be decreased, to decrease an efficiency of the gripping.

In addition, since each negative line through which the negative pressure is applied is divided to be connected to each vacuum pad, the gripping force may be decreased when each vacuum pad is not tightly attached to the obstacle, and thus the gripping may be failed.

Related prior art is Korean patent No. 1784780.

SUMMARY

The present invention is developed to solve the above-mentioned problems of the related arts. The present invention provides a soft grip head, a soft grip unit having the soft grip head, and a grip device having the soft grip unit, capable of improving gripping an obstacle.

According to an example embodiment, the soft grip head has a suction pad and the suction pad makes contact with an object. The suction pad includes a sidewall and a plurality of suction cells. The sidewall divides the suction pad into a plurality of spaces, and both ends of each of the spaces are open. A plurality of suction cells is respectively formed by the spaces divided by the sidewall. The suction pad includes a material having a stiffness along an axial direction smaller than a stiffness along a width direction. The suction cells extend along the axial direction, and the width direction is substantially perpendicular to the axial direction.

In an example, the suction pad may further include a first material layer having a first stiffness and extending along the width direction of the suction cells, and a second material layer having a second stiffness smaller than the first stiffness.

In an example, a plurality of the first material layers may be spaced apart from each other by a predetermined distance along the width direction of the suction cells. A plurality of the second material layers may be disposed between the first material layers adjacent to each other.

In an example, the suction pad may further include a plurality of supporting parts fixed inside of each of the suction cells by a predetermined distance, along a circumferential direction of the suction cells.

According to an example embodiment, a soft grip head includes a suction pad and a flexible supporting part. The suction pad has a sidewall dividing the suction pad into a plurality of spaces, and a plurality of suction cells is respectively formed by the spaces divided by the sidewall. Both ends of each of the spaces are open. The flexible supporting part is disposed in the spaces of the suction cells. A stiffness of the flexible supporting part along an axial direction is smaller than a stiffness along a width direction. The suction cells extend along the axial direction and the width direction is substantially perpendicular to the axial direction. A shape of the suction pad changes to grip an object with suction, in response to a suction force being applied into the spaces of the suction cells.

In an example, the flexible supporting part may be filled or disposed inside of each of the suction cells. The flexible supporting part may be changed with the change of the shape of the suction pad, and an air may pass through the flexible supporting part.

In an example, the flexible supporting part may include a sponge or a porous structure.

In an example, the flexible supporting part may include a coil spring making contact with an inner surface of each of the suction cells.

In an example, a first end of the flexible supporting part may be spaced apart from an inlet of the suction cell by a predetermined distance.

In an example, a stopper may be disposed at each suction cell, and the stopper may be protruded from an inner surface of the suction cell to prevent the first end of the flexible supporting part from moving into the inlet of the suction cell.

In an example, the suction pad may further include a plurality of inner bodies, and each of the inner bodies may continuously extend from each of the suction cells and be open. A cross-sectional area of each of the inner bodies may be smaller than that of each of the suction cells.

In an example, the flexible supporting part may extend from the space of the suction cell toward an inner space of the inner body.

In an example, a width of a cross-section of the suction cell may decrease as the suction cell goes toward the inner body.

In an example, a cross-sectional shape of the suction cell along the width direction, may be one of a triangle, a rectangular, a pentagon, a hexagon and a polygon.

In an example, the soft grip head may further include a block part formed along an outline of the suction cells, and changes a stiffness of the suction pad, and a pressure control part configured to control a negative pressure inside of the block part.

In an example, particles may be filled inside of the block part. Adhesion between the particles may increase to increase a stiffness of the block part, as the pressure control part provides the negative pressure inside of the block part.

According to an example embodiment, a soft grip head include a soft grip head, a fixing cap, a suction force generating part and a connecting line. The fixing cap is configured to support the soft grip head. The suction force generating part is configured to provide a suction force to the soft grip head. The connecting line is configured to connect the suction force generating part with the fixing cap. The soft grip head includes a suction pad and a flexible supporting part. The suction pad has a sidewall dividing the suction pad into a plurality of spaces, and a plurality of suction cells is respectively formed by the spaces divided by the sidewall. Both ends of each of the spaces are open. The flexible supporting part is disposed in the spaces of the suction cells. A stiffness of the flexible supporting part along an axial direction is smaller than a stiffness along a width direction. The suction cells extend along the axial direction and the width direction is substantially perpendicular to the axial direction. A shape of the suction pad changes to grip an object with suction, in response to a suction force being applied into the spaces of the suction cells. The fixing cap includes a through hole connected to each of the suction cells.

In an example, a distance between centers of the suction cells adjacent to each other may be smaller than a distance between the through holes adjacent to each other.

In an example, the soft grip head may further include a check valve configured to the connecting line to open or close the connecting line.

According to an example embodiment, a grip device includes a body, a connecting part, the soft grip unit, at least one arm and a holding part. The connecting part extends from the body toward an outside. The soft grip unit is disposed at a first end of the connecting part. At least one arm extends from the body toward an outside of the soft grip unit. The holding part is connected to an end of the arm, to fix an object with the soft grip unit.

According to the present example embodiments, in the soft grip head, the plurality of the suction cells is divided by the sidewall, and each of the suction cells has the stiffness along the axial direction smaller than that along the width direction, so that an opening of the suction cells is prevented from being blocked and an attaching area is increased in the gripping with suction. Thus, the gripping may be more efficient.

Here, the material of the soft grip head is maintained to have the stiffness along the width direction more largely, or the flexible supporting part is filled or disposed inside of the suction cells, so that the shape of the suction cells is properly maintained and the suction force is properly provided in the gripping with suction.

Further, the soft grip unit is configured to have the soft grip head and the components providing the suction force, and various kinds of soft grip devices may be designed for gripping the object having various shapes more efficiently.

---

Figure 1:
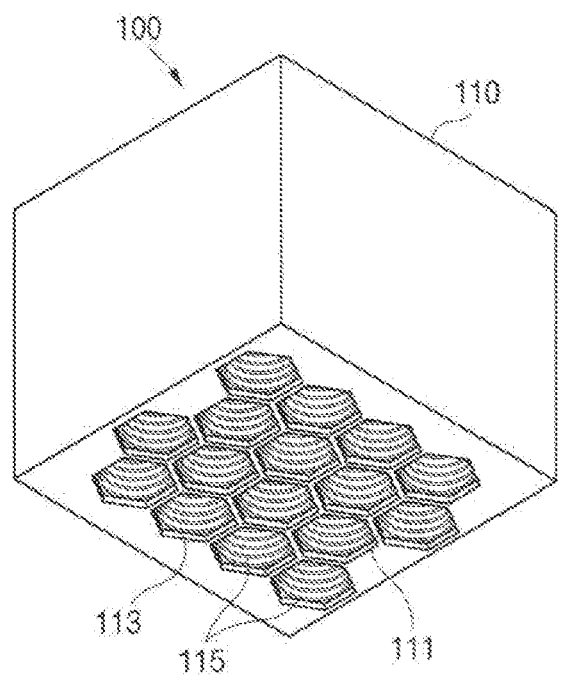
FIG. 1 is a perspective view illustrating a soft grip head according to an example embodiment of the present invention.

* Reference numerals 100, 101, 102, 1100, 1200, 1300, 1400: soft grip head
110, 1110, 1210, 1310, 1410: suction pad
111, 1111, 1220, 1320, 1420: sidewall    112: stopper
113, 1113, 1230, 1330, 1430: suction cell
115, 1115, 1240, 1440: flexible supporting part
117: mounting groove    118: inner body
120, 1250, 1500: fixing cap    130: connecting line
140: suction power generating part    150: check valve
200, 201, 2000, 2001, 2002: soft grip unit
300: body    400: connecting part
500: arm    550: holding part
600, 601: grip device    1260: block part
1261: particle    1340: supporting part
1431: flange

---

DETAILED DESCRIPTION

The invention is described more fully hereinafter with Reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise defined, all terms (including technical and scientific terms) used herein have the same meaning as commonly understood by one of ordinary skill in the art to which this invention belongs.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments of the present invention are explained in detail referring to the figures.

Figure 2:
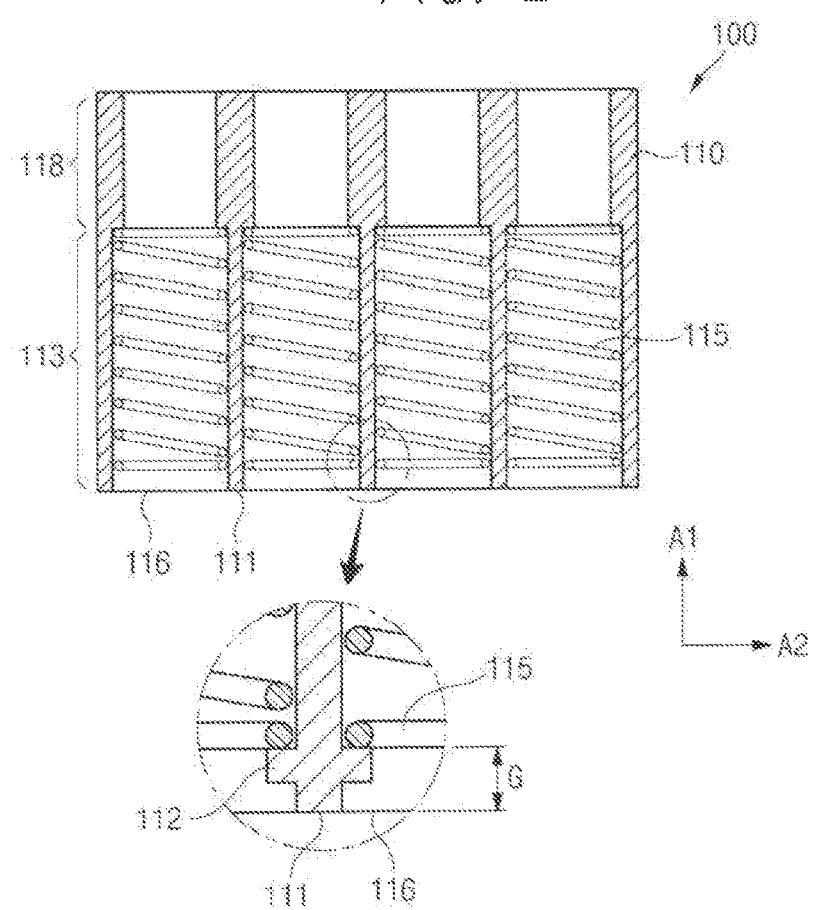
FIG. 2 is a cross-sectional view illustrating the soft grip head of FIG. 1.

FIG. 1 is a perspective view illustrating a soft grip head according to an example embodiment of the present invention. FIG. 2 is a cross-sectional view illustrating the soft grip head of FIG. 1.

Referring to FIG. 1 and FIG. 2, the soft grip head according to the present example embodiment includes a suction pad 110 and a flexible supporting part 115.

The suction pad 110 has a sidewall 111, and a plurality of suction cells 113. The suction pad 110 is divided by the sidewall 111, to form the plurality of the suction cells 113.

Both ends of the sidewall 111 are open, and the sidewall 111 divides the suction pad 110 into a plurality of spaces, and the spaces divided by the sidewall 113 is formed to be the suction cells 113.

The sidewall 111 may include a flexible material, and both ends of each of the suction cells 113 are also open and an opening is formed through each of the suction cells 113.

A suction force may be provided from outside into the space inside of the suction cells 113. An inlet 116 formed at a first end of the suction pad 110 makes contact with an obstacle, and the obstacle may be attached to the suction pad 110 as the suction force is provided to a second end of the suction pad 110.

In addition, the sidewall 111 includes a material blocking an air to pass through the sidewall 111. For example, the suction pad 110 may include a flexible polymer material. Thus, the air flowed into any suction cell 113 may be prevented from passing through the sidewall 111 and from moving to an adjacent suction cell 113.

A thickness of the sidewall 111 between the suction cells 113 adjacent to each other is uniform. In addition, a cross-section of the suction cell 113 along a width direction A2 which is substantially perpendicular to an axial direction A1 of the suction cell 113 may be a polygon shape having the same shape and size. For example, the polygon shape may be a triangle shape, a rectangle shape, a pentagon shape or a hexagon shape.

In the present example embodiment, for the convenience of the explanation, the cross-sectional shape along the width direction A2 is explained to be the hexagon shape, and thus, the suction pad 110 may be a honeycomb shape. The suction cell 113 is divided by the sidewall 111, and thus the space between the suction cells 113 is decreased. Thus, an entire attaching area of the suction cells 113 is increased, to enhance the gripping efficiency.

The flexible supporting part 115 is disposed in the space inside of the suction cell 113. The flexible supporting part 115 has the stiffness along the axial direction A1 smaller than the stiffness along the width direction A2, with respect to the suction cell 113. The flexible supporting part 115 may include a coil spring partially making contact with an inner surface of the suction cell 113.

The coil spring may be a round shape, but not limited thereto. Alternatively, the coil spring may have a shape corresponding to a cross-sectional shape of the suction cell 113 along the width direction. Here, when the cross-sectional shape of the suction cell 113 along the width direction is the hexagon shape, the coil spring may have the hexagon shape, too.

As the suction force is provided from the inlet 116 of the suction cell 113 toward the second end of the suction cell 113 and the object is attached to the inlet 116 of the suction cell 113, the object is gripped with suction to the inlet 116 of the suction cell 113, due to the suction force. As the object is gripped with suction, the inlet 116 of the suction cell 113 is pressed and transformed by the object. Here, as the shape of the suction cell 113 changes, the sidewall 111 of the suction cell 113 may be depressed and thus the suction cell 113 may be blocked. In this case, even though the suction force is fully provided, the sectional flow is blocked or decreased and thus the suction force on the object may be decreased.

However, in the present example embodiment, the flexible supporting part 115 has the stiffness along the width direction A2 larger than the stiffness along the axial direction A1, and thus a blocking force on the depressed transform of the suction cell 113 along the width direction due to the depression of the sidewall 111 may be provided. Thus, a collapse of the suction cell 113 is minimized and the suction cell 113 is prevented from being blocked. Accordingly, the suction force may be stably provided to the object.

Here, a first end of the flexible supporting part 115 is spaced apart from the inlet 116 of the suction cell 113 by a predetermined distance. Thus, the inlet 116 of the suction cell 113 is not supported by the flexible supporting part 115, and the shape of the inlet 116 is freely changed. The inlet 116 of the suction cell 113 is tightly attached to a surface of the object and functions as a suction cup blocking the suction cell 113. Thus, as the inlet 116 is not supported by the flexible supporting part 115, the inlet 116 is easily attached to the surface of the object with various transformations.

Here, a length of the inlet 116 not supported by the flexible supporting part 115, which is a reference distance G, is formed such that the inlet 116 does not block the opening of the suction cell 113 even though the inlet 116 is rolled inside of the suction cell 113. For example, when the suction cell 113 has a circular shape cross-section, the reference distance G may be shorter than a radius of each of the suction cell 113.

The surface of the object is irregular, a portion of the inlet 116 of the suction cell 113 which is spaced apart from the surface of the object may be rolled inside of the suction cell 113 due to the suction force. Here, the flexible supporting part 115 effectively limits shrinkage of the suction cell 113 along the width direction in the suction cell 113, to block the inlet 116 of the suction cell 113 from being rolled inside of the suction cell 113 over the reference distance G.

In addition, when the object attached to the suction cell 113 is removed, the suction cell 113 is efficiently restored into an initial shape due to the flexible supporting part 115. Here, the stiffness of the flexible supporting part 115 along the width direction A2 is larger than the stiffness along the axial direction A1, and thus the cross-section of the suction cell 113 along the width direction A2 is stably restored into the initial shape.

The suction cell 113 includes a stopper 112. The stopper 112 is protruded from the inner surface of the suction cell 113 at a position corresponding to the reference distance G. The stopper 112 constrains the first end of the flexible supporting part 115 inserted into the suction cell 113, to block the flexible supporting part 115 from moving toward the inlet 116 of the suction cell 113. Thus, the stopper 112 prevents the flexible supporting part 115 from getting out of the suction cell 113.

In addition, the flexible supporting part 115 pushes the stopper 112 so that the suction cell 113 is unfolded along the axial direction A1 and is efficiently restored into the initial shape, when the object is removed and the suction cell 113 is restored into the initial shape.

The suction pad 110 includes an inner body 118 configured to the second end of the suction cell 113. The number of the inner bodies 118 is the same as that of the suction cells 113, and each inner body 118 continuously extends from each suction cell 113. Here, the inner body 118 is formed as an opening hole.

Here, a cross-sectional area of each of the suction cell 113 is larger than that of each of the inner bodies 118.

Each inner body 118 has a central axis substantially same as each suction cell 113, and the inner body 118 functions as a base supporting the suction cell 113. An opening width inside of each inner body 118 is smaller than that of each suction cell 113, and thus the second end of the flexible supporting part 115 is tightly attached to a stepped portion formed between the inner body 118 and the suction cell 113. Thus, the second end of the flexible supporting part 115 is stably disposed inside of the suction cell 113.

Figure 3:
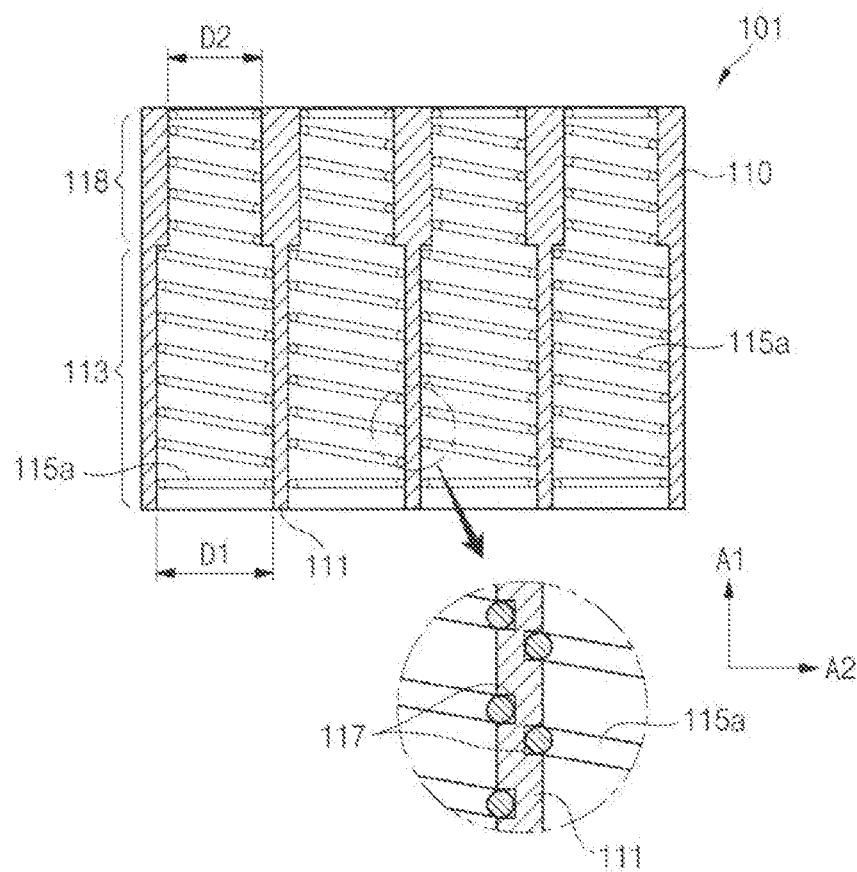
FIG. 3 is a cross-sectional view illustrating a soft grip head according to another example embodiment of the present invention.

FIG. 3 is a cross-sectional view illustrating a soft grip head according to another example embodiment of the present invention.

The soft grip head 101 according to the present example embodiment is substantially same as the soft grip head 100 of FIG. 1 and FIG. 2, except for an inserting position of a flexible supporting part, and thus same reference numerals are used for same elements and any repetitive explanation will be omitted.

Referring to FIG. 3, in the soft grip head 101, the flexible supporting part 115a is positioned to be inserted into the inner body 118 in addition to the suction cell 113.

The flexible supporting part 115a has a first diameter D1 which is substantially same as a width of an inner cross-section of the suction cell 113, at an inner side of the suction cell 113. In addition, the flexible supporting part 115a has a second diameter D2 which is substantially same as a width of an inner cross-section of the inner body 118, at an inner side of the inner body 118. Here, the second diameter D2 is smaller than the first diameter D1.

Accordingly, the flexible supporting part 115a is inserted into the inner body 118, so that an axial length of the flexible supporting part 115a may be elongated. Thus, a compressible length of the flexible supporting part 115a may be increased, and a spring constant of the flexible supporting part 115a may be decreased. Here, the flexible supporting part 115a is compressed more efficiently with a relatively smaller suction force, and thus the flexible supporting part 115a does not interrupt a transformation of the suction cell 113.

In addition, the suction cell 113 has a mounting groove 117. The mounting groove 117 is depressed to have a spiral shape on an inner surface of the suction cell 113, and the flexible supporting part 115a is inserted into the mounting groove 117. Thus, when the suction cell 113 is restored to the initial shape, the flexible supporting part 115a is inserted into the mounting groove 117 and is restored, and thus the suction cell 113 may be restored into the initial shape more efficiently.

Although not shown in the figure, the stopper 112 explained in FIG. 2 may replace the mounting groove 117. Alternatively, both of the mounting groove 117 and the stopper 112 may be formed.

Figure 4:
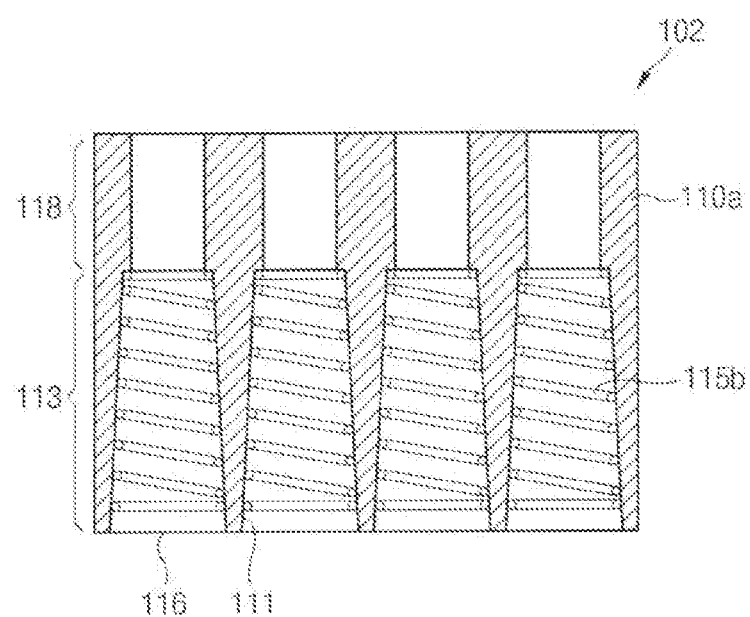
FIG. 4 is a cross-sectional view illustrating a soft grip head according to still another example embodiment of the present invention.

FIG. 4 is a cross-sectional view illustrating a soft grip head according to still another example embodiment of the present invention.

The soft grip head 102 according to the present example embodiment is substantially same as the soft grip head 100 of FIG. 1 and FIG. 2, except for a shape of a suction cell 113 and a shape of the flexible supporting part 115b, and thus same reference numerals are used for same elements and any repetitive explanation will be omitted.

Referring to FIG. 4, in the soft grip head 102 according to the present example embodiment, a width of the cross-section of the suction cell 113 of the suction pad 110a is decreased as the suction cell 113 goes from the inlet 116 toward the inner body 118. Here, the diameter of the flexible supporting part 115b may be decreased too, as the flexible supporting part 115b goes from the inlet 116 toward the inner body 118.

Accordingly, the diameter of the flexible supporting part 115b is the maximum at a position adjacent to the inlet 116 of the suction cell 113, so that the flexible supporting part 115 and the sidewall 111 may be adhered to each other more tightly, at the position adjacent to the inlet 116. Thus, the inlet 116 may be prevented from being depressed excessively.

Here, the flexible supporting part 115b may extend toward the inner body 118, and at least one of the mounting groove 117 and the stopper 112 may be formed, as explained above.

Figure 5:
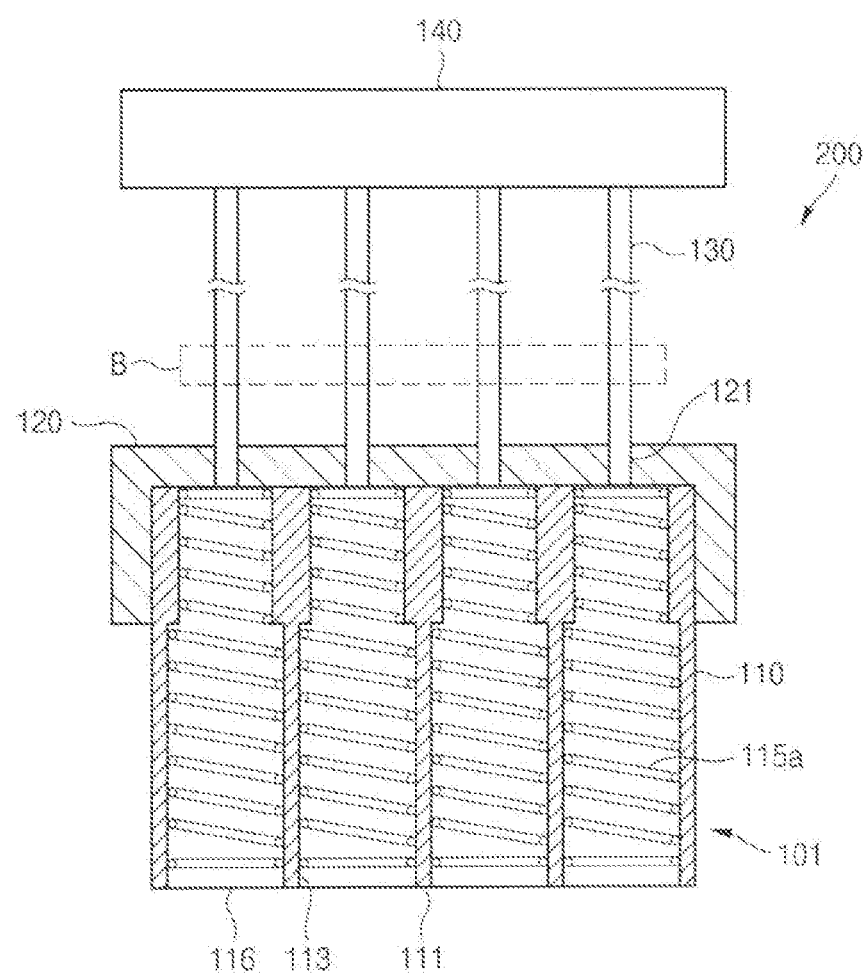
FIG. 5 is a cross-sectional view illustrating a soft grip unit having the soft grip head of FIG. 3.

FIG. 5 is a cross-sectional view illustrating a soft grip unit having the soft grip head of FIG. 3.

Referring to FIG. 5, the soft grip unit 200 includes the soft grip head 101, a fixing cap 120, a suction force generating part 140 and a connecting line 130. Here, the soft grip unit 200 is explained to include the soft grip head 101 explained in FIG. 3, but not limited thereto. Thus, the soft grip unit 200 may include the soft grip head 100 in FIG. 1, or may include the soft grip head 102 in FIG. 4.

The soft grip head 101 is explained above, and thus any repetitive explanation will be omitted.

The fixing cap 120 is combined with the second end of the suction pad 110. The fixing cap 120 includes a through hole 121 connected to each of the suction cells 113. When the suction pad 110 has the inner body 118, the fixing cap 120 is combined with the inner body 118.

The suction force generating part 140 generates the suction force.

The connecting line 130 connects the suction force generating part 140 with the fixing cap 120, and thus the connecting line 130 guides the suction force from the suction force generating part 140 into each suction cell 113 of the suction pad 110.

The connecting line 130 may be a plural, and a first end of the connecting line 130 is connected to the suction force generating part 140 and a second end of the connecting line 130 is connected to the through hole 121 independently. The suction force from the suction force generating part 140 is provided to each suction cell 113 uniformly through each connecting line 130.

Figure 6A:
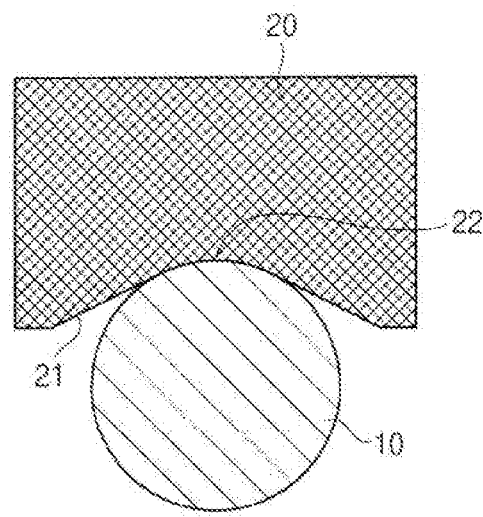
FIG. 6A is a cross-sectional view illustrating a gripping state on an object using a conventional soft grip unit.
Figure 6B:
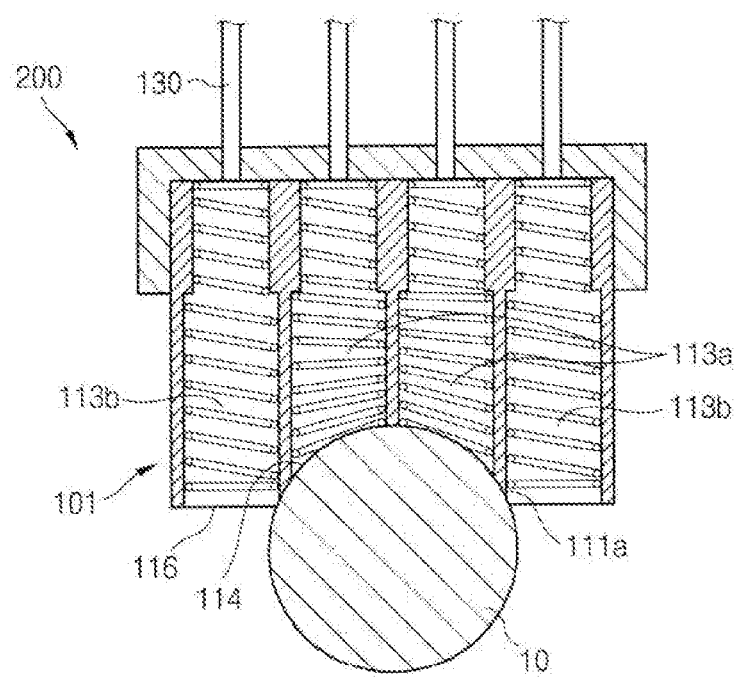
FIG. 6B is a cross-sectional view illustrating a gripping state on the object using the soft grip unit of FIG. 5.

FIG. 6A is a cross-sectional view illustrating a gripping state on an object using a conventional soft grip unit, and FIG. 6B is a cross-sectional view illustrating a gripping state on the object using the soft grip unit of FIG. 5.

Referring to FIG. 6A, in the conventional soft grip unit 20, when pressed by the object 10, a surface 21 of the soft grip unit 20 is entirely compressed but a contact area 22 with the object 10 is relatively small.

In addition, in the convention soft grip unit 20, pores inside of the soft grip unit 20 are connected with each other, and thus the suction force applied to the object 10 is decreased.

Alternatively, referring to FIG. 6B, in the soft grip unit 200 according to the present example embodiment, when the object 10 is attached to the inlet 116 of the suction pad 110, the inlet 116 of the suction pad 110 is pressed by the object 10.

Here, since the suction pad 110 has the suction cells 113 divided by the sidewall 111, the suction cell 113a making contact with the object 10 is pressed by the object 10 and the shape of the suction cell 113a is changed, but the sucking cell 113b not making contact with the object 10 is not pressed by the object 10 and the shape of the suction cell 113b is not changed. In addition, most of the portions 114 including the inlet 116 pressed by the object 10 makes contact with the surface of the object 10.

Accordingly, compared to the conventional soft grip unit 20, the area of the portions of the suction pad 110 making contact with the object 10 is relatively increased, and thus the suction force applied to the object 10 may be increased more.

In addition, since the air is blocked by the sidewall 111, the suction force of the suction cell 113a to which the object 10 is attached is only applied to the object 10, and thus the suction force may be increased more.

Figure 7:
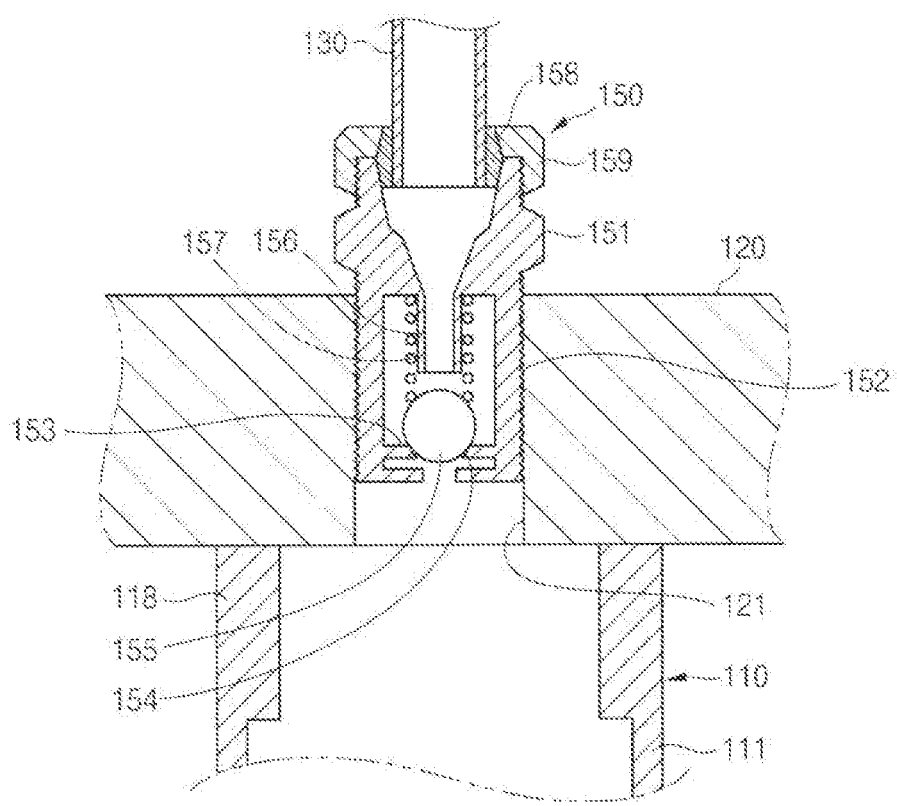
FIG. 7 is a cross-sectional view illustrating the soft grip unit of FIG. 5 combined with a check valve.

FIG. 7 is a cross-sectional view illustrating the soft grip unit of FIG. 5 combined with a check valve.

Referring to FIG. 7, in the soft grip unit 200, a check valve 150 is configured between the fixing cap 120 and the connecting line 130, and thus an opening and closing of the connecting line 130 is controlled.

Here, the check valve 150 includes a socket 151, a flange 153, a ball 155, a stop unit 156, an elastic member 157, a combining ring 158 and a pressing cover 159.

The socket 151 is combined with the through hole 121 of the fixing cap 120 with a screw 152, and a center of the socket 151 is open along the axial direction.

The flange 153 is configured to a first end of the socket 151, and an opening hole 154 is formed at the center of the flange 153.

The ball 155 is configured inside of the socket 151, and a diameter of the ball 155 is larger than that of the opening hole 154 of the flange 153.

The stop unit 156 extends inside of the socket 151 along the axial direction of the socket 151, and a center of the stop unit 156 is open along the axial direction. The center of the stop unit 156 is aligned with the center of the opening hole 154 of the flange 153. An inner diameter of the stop unit 156 is smaller than the diameter of the ball 155.

The elastic member 157 is disposed around the stop unit 156. A first end of the elastic member 157 is tightly adhered to the socket 151, and a second end of the elastic member 157 is tightly adhered to the ball 155, to support the ball 155 toward the flange 153. At the initial state, the ball 155 is supported by the elastic member 157 to close the opening hole 154.

The combining ring 158 is combined with a first end of the connecting line 130, and is combined with a second end of the socket 151.

The pressing cover 159 is combined with the second end of the socket 151 to fix the combining ring 158, and the pressing cover 159 is combined with the socket 151 with a screw.

Figure 8A:
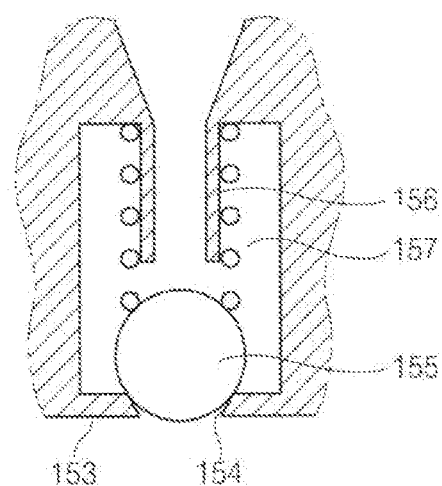
FIG. 8A, FIG. 8B, FIG. 9A and FIG. 9B are cross-sectional views illustrating an operation state of the check valve of FIG. 7.
Figure 8B:
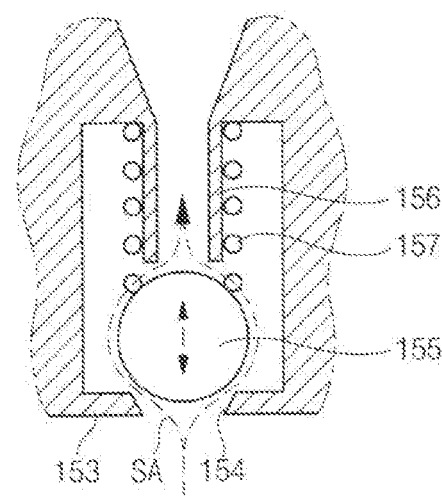
Figure 9A:
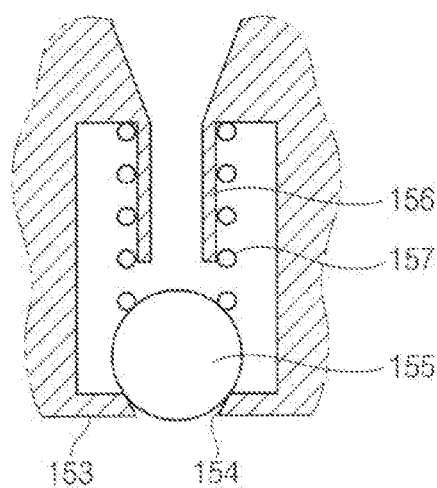
Figure 9B:
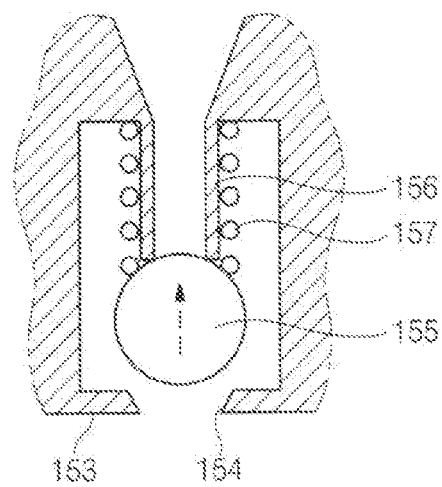

FIG. 8A, FIG. 8B, FIG. 9A and FIG. 9B are cross-sectional views illustrating an operation state of the check valve of FIG. 7. Here, the operating state of the check valve connected to the suction cell which is attached to the object is illustrated in FIG. 8A and FIG. 8B. The operating state of the check valve connected to the suction cell which is not attached to the object is illustrated in FIG. 9A and FIG. 9B.

Referring to FIG. 8A and FIG. 8B, as the suction force is provided through the connecting line 130, an air SA is inhaled due to the suction force and the ball 155 moves upwardly. Then, the elastic member 157 is compressed to open the opening hole 154, and as the suction force is continuously provided, the object 10 is continuously attached to the suction cell 113a. Here, as the object 10 entirely closes the suction cell 113a, the inhaled flow of the air SA is removed and the connecting line is to be a vacuum. Then, the ball 155 moves downwardly again due to the elastic restoring force, to block the opening hole 154.

When an amount of air flow inhaled to each suction cell in the state that the object 10 is not attached to the suction pad 110 is defined as a first flow, a second flow larger than the first flow is generated at the suction cell to which the object is not attached, since the ball 155 blocks the opening hole 154 and the air flow is also blocked at the suction cell to which the object is attached.

Then, as illustrated in FIG. 9A and FIG. 9B, the elastic member 157 is compressed more and the ball 155 closes the stop unit 156. Here, the check valve configured to the connecting line connected to the suction cell 113b to which the object is not attached is closed by the suction force of the suction cell. Accordingly, when the air is not inhaled through the entire suction cell 113 of the suction pad 110, the object 10 may be attached to the suction cell 113 more strongly.

As illustrated in FIG. 5, the check valve 150 may be configured to a position B of the connecting line 130, and thus both ends of the check valve 150 are connected to the connecting line 130.

Figure 10:
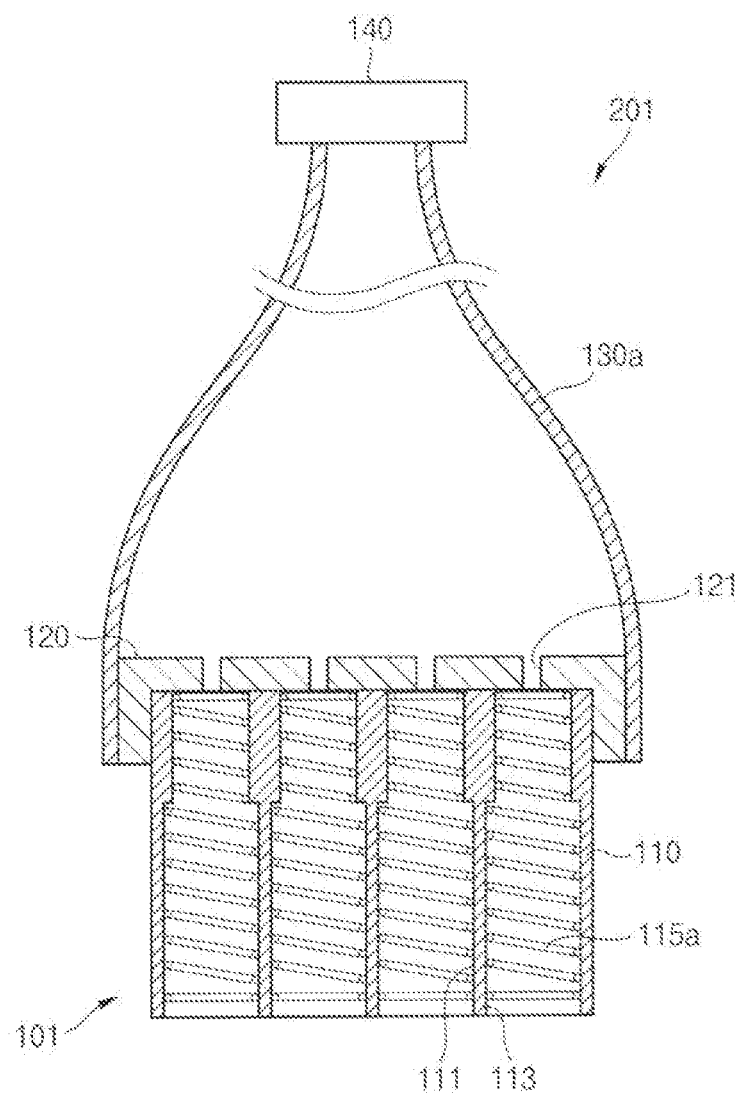
FIG. 10 is a cross-sectional view illustrating another example soft grip unit having the soft grip head of FIG. 3.

FIG. 10 is a cross-sectional view illustrating another example soft grip unit having the soft grip head of FIG. 3.

Referring to FIG. 10, in the soft grip head 201, the connecting line 130a is configured to be a single connecting line. Here, a first end of the connecting line 130a is connected to the suction force generating part 140, and a second end of the connecting line 130a is connected to the fixing cap 120. A plurality of through holes 121 is formed inside of the connecting line 130a.

Accordingly, in the case that the connecting line 130a has the single connecting line, although not shown in the figure, the check valve 150 is connected to each through hole 121. Here, a first end of the check valve 150 is connected to the through hole 121, and a second end of the check valve 150 is formed as open inside of the connecting line 130a. The operation of the check valve 150 is the same as explained above.

Figure 11A:
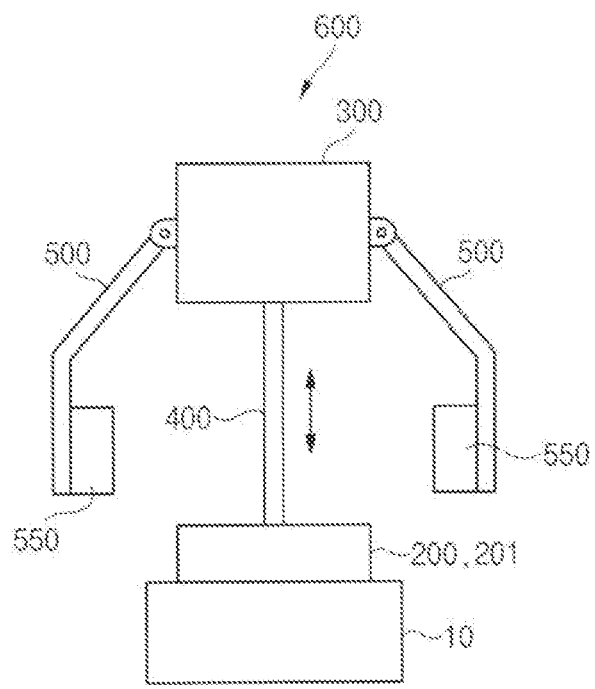
FIG. 11A and FIG. 11B are schematic diagrams illustrating a grip device having the soft grip unit of FIG. 5 or the soft grip unit of FIG. 10.
Figure 11B:
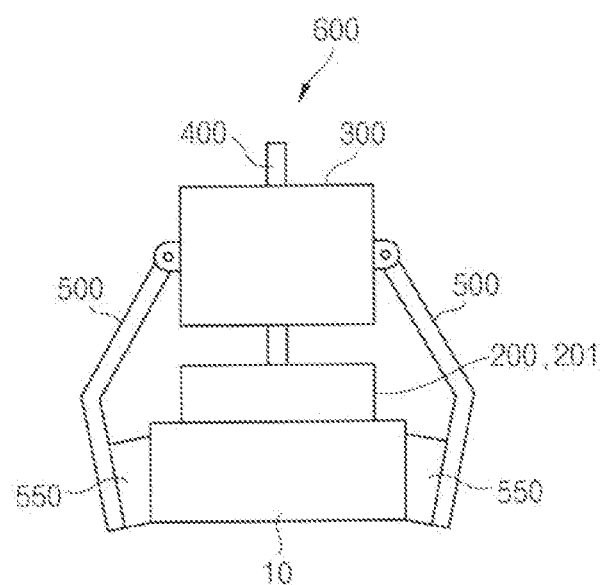

FIG. 11A and FIG. 11B are schematic diagrams illustrating a grip device having the soft grip unit of FIG. 5 or the soft grip unit of FIG. 10.

Referring to FIG. 11A and FIG. 11B, the grip device 600 includes a body 300, a connecting part 400, a soft grip unit 200 and 201, an arm 500 and a holding part 550.

The connecting part 400 is connected to the body 300, and extends outward of the body 300. The soft grip unit 200 and 201 is configured at an end of the connecting part 400. The connecting part 400 moves the soft grip unit 200 and 201 toward or far away from the body 300. Here, the connecting part 400 moves straightly, to move the soft grip unit 200 and 201 toward or far away from the body 300.

When the soft grip unit 200 and 201 grips an upper surface of the object with suction, the connecting part 400 moves the soft grip unit 200 and 201 upwardly.

Here, the connecting line 130 and 130a of the soft grip unit 200 and 201 is disposed inside of the connecting part 400.

The arm 500 may be a plural, and a first end of the arm 500 is combined with the body 300. Second ends of the arms 500 are spaced apart from each other, and the second ends of the arms 500 may move closely. As illustrated in the figure, the arm 500 is connected to the body 300 via a hinge, but not limited thereto.

The holding part 550 is configured at the second end of the arm 500. The holding part 550 presses and holds a side surface of the object 10, as the arm 500 moves closely.

Operation steps of the soft grip unit 200 and 201 and the holding part 550 may not be limited. For example, as illustrated in FIG. 11A, with the object 10 attached to the soft grip unit 200 and 201, the connecting part 400 moves upwardly, and then, as illustrated in FIG. 11B, the arms 500 move closely so that the holding part 550 presses and holds the side surface of the object 10. Thus, the object 10 may be gripped more stably.

Alternatively, the soft grip unit 200 and 201 grips an upper surface of the object 10 with suction, and at the same time, the side surface of the object 10 is also pressed, to hold the object 10.

Figure 12:
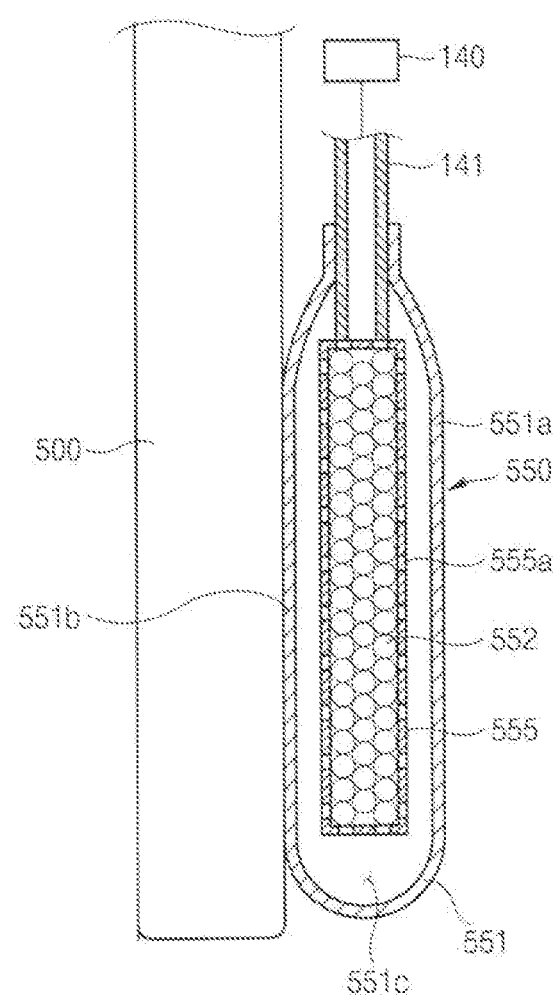
FIG. 12 is a cross-sectional view illustrating a holding part of FIG. 11A and FIG. 11B.

FIG. 12 is a cross-sectional view illustrating a holding part of FIG. 11A and FIG. 11B.

As illustrated in FIG. 12, the holding part 550 is transformed by the object 10, and includes a flexible cover 551 and a particle 552.

The flexible cover 551 includes a holding surface 551a and a combining surface 551b. The holding surface 551a forms a first side surface of the flexible cover 551 and is tightly adhered to the object 10. The combining surface 551b forms a second side surface of the flexible cover 551 and is combined with the arm 500. A receiving space 551c is formed inside of the flexible cover 551.

The flexible cover 551 is a flexible layer shape, and an air is blocked by the flexible cover 551.

The particle 552 is filled in the pocket 555, and the particle 552 is a type of powder.

As the flexible cover 551 is pressed by the object 10, the pocket 555 and the particle 552 are transformed according to the shape of the object 10. Here, the transformation of the particle means that the particles pressed by the object 10 are pushed so that the entire shape of the pocket 555 is transformed.

The suction force generating part 140 is connected to the pocket 555. The suction force generating part 140 may further include a suction line 141, and the suction line 141 extends into the receiving space 551c. An air inside of the pocket 555 is inhaled through the suction line 141. The pocket 555 may have a pore 555a.

As the air inside of the receiving space 551c is inhaled by the suction force generating part 140, the flexible cover 551 is contracted and the particle 552 is tightly compressed and tightly fixed due to the compressed flexible cover 551.

With the object 10 pressing the holding surface 551a, the air inside of the receiving space 551c is inhaled by the suction force generating part 140, and then the particle 552 which is transformed by the pressing of the object 10 is compressed more tightly due to the compression of the flexible cover 551. Then, the particle 552 and the flexible cover 551 may be hardened. Thus, the side surface of the object 10 pressing the holding surface 551a may be stably gripped by the flexible cover 551.

Here, the holding part 550 may not limited thereto, in which the holding part 550 is soft in a normal condition and is hardened due to the suction force. Thus, the holding part 550 may be a sponge type.

Figure 13A:
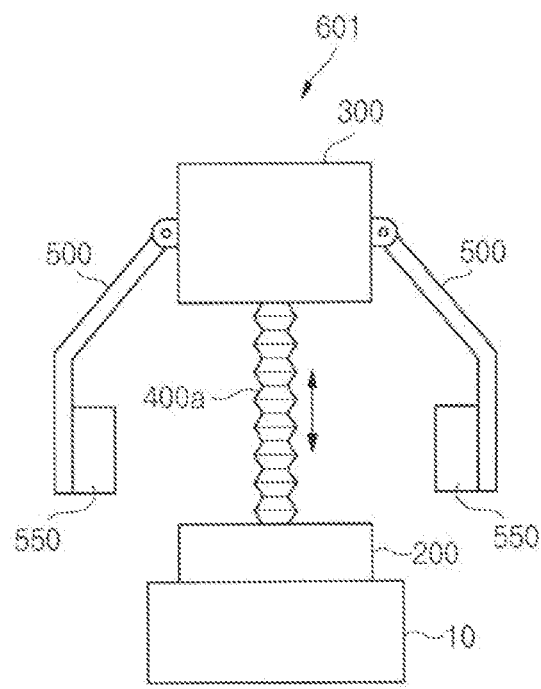
FIG. 13A and FIG. 13B are schematic diagrams illustrating another example grip device having the soft grip unit of FIG. 5 or the soft grip unit of FIG. 10.
Figure 13B:
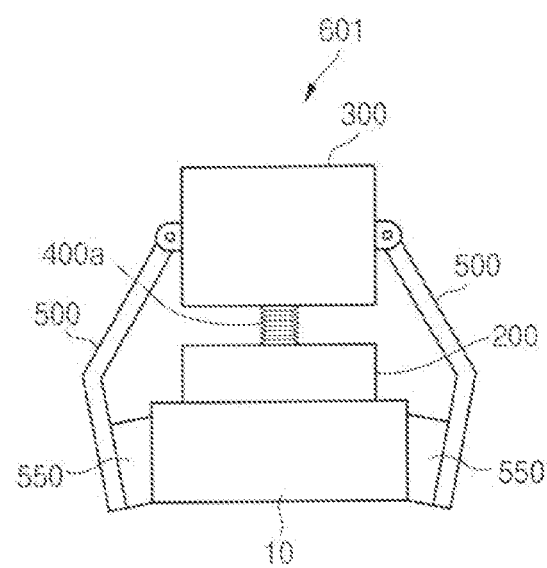

FIG. 13A and FIG. 13B are schematic diagrams illustrating another example grip device having the soft grip unit of FIG. 5 or the soft grip unit of FIG. 10.

Referring to FIG. 13A and FIG. 13B, in the grip device 601, the connecting part 400a is formed to be elongated, and thus the soft grip unit 200 may go toward or be away from the body part 300. The elements of the grip device 601 are substantially same as those of the grip device in FIG. 11A and FIG. 11B.

Figure 14:
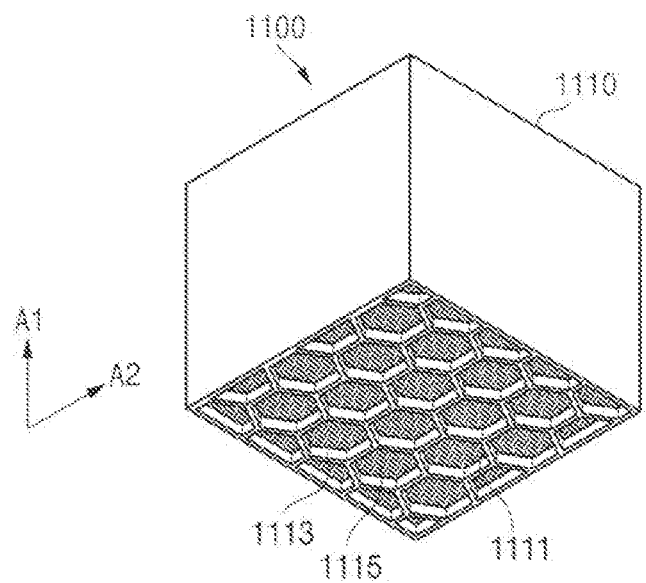
FIG. 14 is a perspective view illustrating a soft grip head according to still another example embodiment of the present invention.
Figure 15:
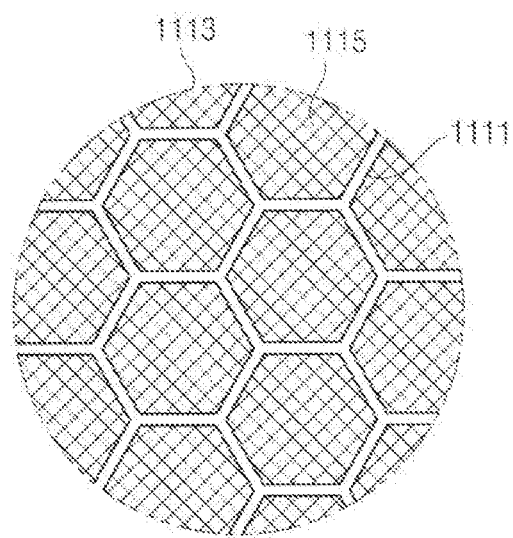
FIG. 15 is a bottom view partially illustrating the soft grip head of FIG. 14.

FIG. 14 is a perspective view illustrating a soft grip head according to still another example embodiment of the present invention, and FIG. 15 is a bottom view partially illustrating the soft grip head of FIG. 14.

Referring to FIG. 14 and FIG. 15, the soft grip head 1100 according to the present example embodiment includes a suction pad 1110 and a flexible supporting part 1115.

The suction pad 1110 includes a sidewall 1111, and a plurality of suction cells 1113. The suction pad 1110 is divided by the sidewall 1111, and thus the suction cells 1113 are formed.

The flexible supporting part 1115 is filled inside of the suction cell 1113, and in the present example embodiment, the soft grip head 1100 is substantially same as the soft grip head 100 in FIG. 1, except for the flexible supporting part 1115. Thus, any repetitive explanation will be omitted.

The structure, the material, the shape and so on of the sidewall 1111 and the suction cell 1113, are substantially same as those of the sidewall 111 and the suction cell 113 in FIG. 1.

The flexible supporting part 1115 is filled inside of the suction cell 1113, and the flexible supporting part 1115 may include a material such that the flexible supporting part 1115 may be easily transformed and the air may be blocked. For example, the material may include a sponge or a porous structure.

Accordingly, as the flexible supporting part 1115 is filled inside of the suction cell 1113, the object is attached to a first end of the suction cell 1113 with suction, when the suction force is applied from the first end of the suction cell 1113 toward a second end of the suction cell 1113. When the object is attached with suction, the first end of the suction cell 1113 is pressed by the object to be transformed. Here, when the surface of the object is irregular, a portion of the first end of the suction cell 1113 which is spaced apart from the surface of the object is rolled inside of the suction cell 1113. Thus, the flexible supporting part 1115 supports the suction cell 1113 inside of the suction cell 1113, to prevent the portion of the suction cell 1113 from being rolled inside of the suction cell 1113.

Accordingly, the flexible supporting part 1115 has a stiffness along the axial direction A1 smaller than a stiffness along the width direction A2, so that the flexible supporting part 1115 sufficiently supports the suction cell 1113 to prevent the suction cell 1113 from being rolled inside thereof.

Figure 16:
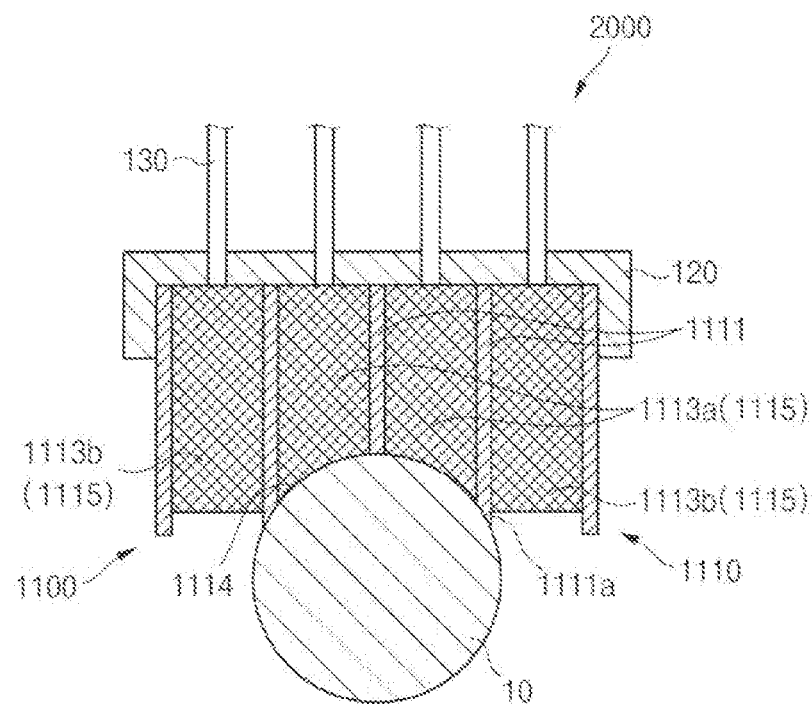
FIG. 16 is a cross-sectional view illustrating a gripping state on an object using the soft grip unit having the soft grip head of FIG. 14.

FIG. 16 is a cross-sectional view illustrating a gripping state on an object using the soft grip unit having the soft grip head of FIG. 14.

Referring to FIG. 16, the soft grip head 1100 according to the present example embodiment is fixed by the fixing cap 120 and is connected by the connecting line 130, so as to be a soft grip unit 2000.

Here, the fixing cap 120 and the connecting line 130 included in the soft grip unit 2000 are the same as explained referring to FIG. 5.

As in the present example embodiment, when the soft grip unit 2000 grips the object 10, compared to the conventional soft grip unit, the area of the suction pad 1110 making contact with the object 10 is relatively increased, to increase the suction force for the object 10.

In addition, in the present example embodiment, the air is blocked by the sidewall 1111 in the suction, and thus the suction force for the object 10 may be increased more.

As the air is blocked by the sidewall during the suction, the suction force by the suction cell 1113a and the flexible supporting part 1115 is applied only to the object 10. Thus, the attached suction cell 1113a and flexible supporting part 1115 are only transformed by the attachment of the object 10, and the suction cell 1113b and the flexible supporting part 1115 corresponding to the suction cell 1113b to which the object 10 is not attached are not transformed and are maintained to be the initial state.

As illustrated in the figure, the flexible supporting part 1115 is spaced apart from the first end of the suction cell 1113, and thus an end 1111a of the sidewall 1111 is not supported by the flexible supporting part 1115. Here, the end 1111a of the sidewall 1111 functions as a suction cup tightly adhered to the surface of the object and blocking the suction cell 1113, and thus the transformation of the end 1111a may be not limited by the flexible supporting part 1115, so that the end 1111a of the sidewall 1111 may be tightly adhered to the surface of the object more efficiently.

Here, a length of the end 1111a of the sidewall 1111 not supported by the flexible supporting part 115 is formed such that the end 1111a of the sidewall 1111 does not block the suction cell 1113 entirely, even though the end 1111a is rolled inside of the suction cell 1113. When the suction cell 1113 has a circular cross-section, the length of the end 1111a of the sidewall 1111 may be smaller than a radius of the suction cell 1113.

Figure 17:
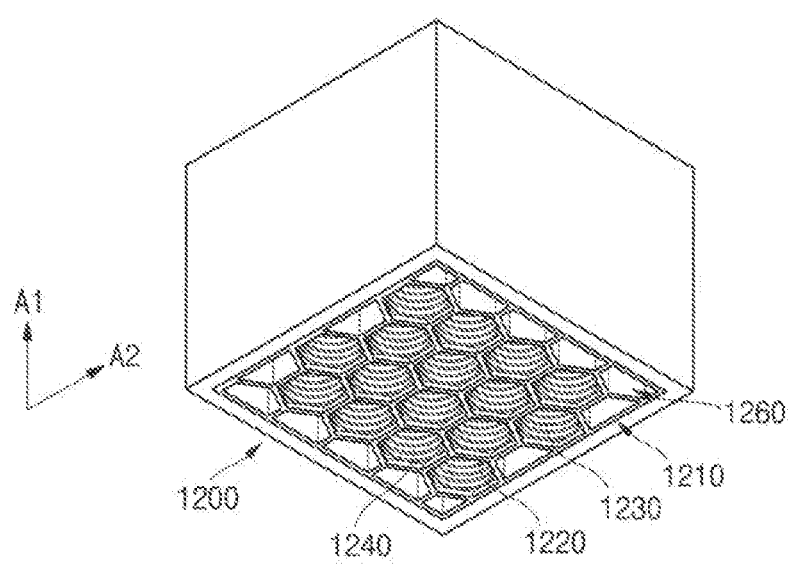
FIG. 17 is a perspective view illustrating a soft grip head according to still another example embodiment of the present invention.

FIG. 17 is a perspective view illustrating a soft grip head according to still another example embodiment of the present invention.

Referring to FIG. 17, the soft grip head 1200 according to the present example embodiment includes a suction pad 1210, a flexible supporting part 1240 and a block part 1260.

Here, as explained above, the suction pad 1210 includes a sidewall 1220 and a plurality of suction cells 1230, and the suction pad 1210 is divided by the sidewall 1220 to for the suction cells 1230. In addition, the flexible supporting part 1240 is disposed inside of the suction cell 1230.

In the present example embodiment, the structure, the material, the shape and so on of the sidewall 1220 and the suction cell 1230 are substantially same as those of the sidewall 111 and the suction cell 113 in FIG. 1.

Further, the flexible supporting part 1240 has a stiffness along the axial direction A1 smaller than a stiffness along the width direction A2 with respect to the suction cell 1230, and the flexible supporting part 1240 may be a coil spring partially making contact with an inner surface of the suction cell 1230, as explained above.

However, in the present example embodiment, the block part 1260 is formed around an outline of the suction pad 1210.

A plurality of the block parts 1260 is formed inside of an outer frame forming the soft grip head 1200, and an outline of the suction cell 113 is covered by the block part 1260 to be disposed inside of the block part 1260. Here, particles 1261 are disposed inside of the block part 1260, and the particles 1261 are explained referring to FIG. 18 below.

Figure 18:
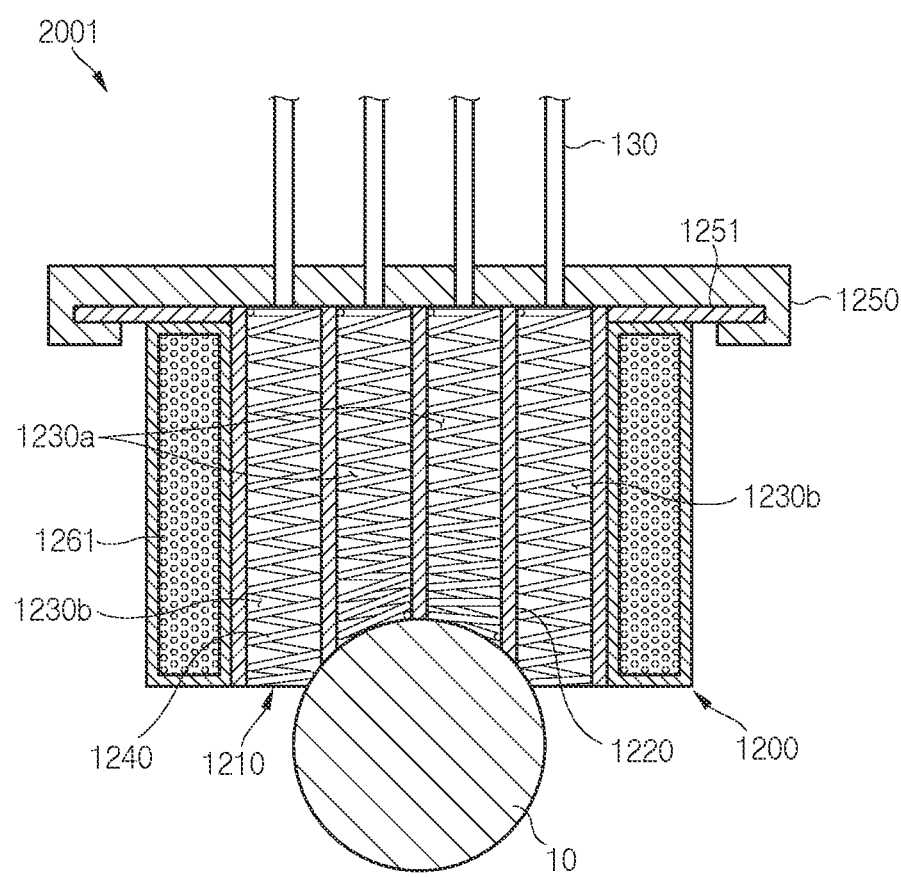
FIG. 18 is a cross-sectional view illustrating a gripping state on an object using the soft grip unit having the soft grip head of FIG. 17.

FIG. 18 is a cross-sectional view illustrating a gripping state on an object using the soft grip unit having the soft grip head of FIG. 17.

Referring to FIG. 18, the soft grip head 1200 according to the present example embodiment is fixed by the fixing cap 1250 and is connected with the connecting line 130, to be a soft grip unit 2001.

Here, the fixing cap 1250 and the connecting line 130 of the soft grip unit 2001 are substantially same as explained referring to FIG. 5. However, in the present example embodiment, the fixing cap 1250 may include a fixing plate 1250 disposed on an upper surface of the block part 1260 and inside of the fixing cap 1250, considering the structure of the block part 11260.

The block part 1260 is disposed outside of the suction cell 1230, and as explained above, the particles 1261 are filled inside of the block part 1260.

Thus, as the particles 1261 are filled inside of the block part 1260, the soft grip head 1200 is maintained to have a predetermined shape.

Although not shown in the figure, a pressure control part (not shown) may be further configured, to control a negative pressure inside of the block part 1260.

The pressure control part is connected to the block part 1260, and controls the negative pressure of the block part 1260, to control an adhesion between the particles 1261. Thus, an entire stiffness of the soft grip head 1200 may be changed.

For example, when the object 10 is not attached to the soft grip unit 2001, the negative pressure is not provided to an inside of the block part 1260 and thus the adhesion between the particles 1261 is relatively low and the block part 1260 is maintained to be easily transformed.

However, as illustrated in FIG. 18, with the object 10 attached to the soft grip unit 2001 with suction, the negative pressure is provided to the inside of the block part 1260, and then the adhesion between the particles 1261 is increased. Thus, the stiffness of the block part 1260 may be increased.

Accordingly, as the block part 1260 increases, the side of the soft grip head 1200 has a predetermined stiffness and thus the attaching state for the object 10 may be maintained more stably. In addition, even though an external force from outside increases, the attaching state for the object 10 may be maintained more stably.

As illustrated in FIG. 18, the soft grip unit 2001 grips the object 10 with a relatively larger contact area, compared to the conventional soft grip unit, and thus the suction force applied to the object 10 may be more increased.

In addition, since the air is blocked by the sidewall 1220 during the suction, the suction force applied to the object 10 may be more increased.

Since the air dose not pass through the sidewall 1220 during the suction, the suction force provided to the suction cell 1230a to which the object 10 is attached and the flexible supporting part 1240 corresponding to the suction cell 1230, is only applied to the object 10. Thus, the suction cell 1230a and the flexible supporting part 1240 to which the object 10 is attached are only transformed due to the suction but the suction cell 1230b and the flexible supporting part 1240 to which the object 10 is not attached are not transformed and are maintained with the initial shape.

Figure 19:
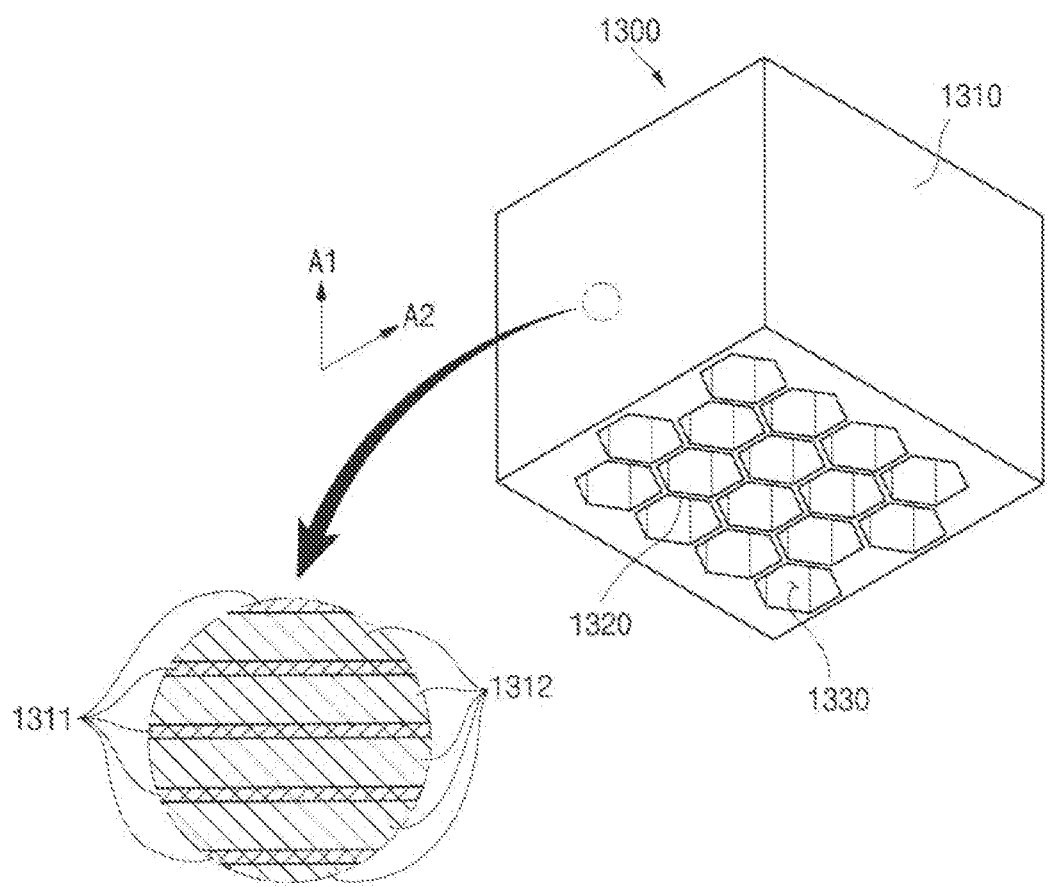
FIG. 19 is a perspective view illustrating a soft grip head according to still another example embodiment of the present invention.

FIG. 19 is a perspective view illustrating a soft grip head according to still another example embodiment of the present invention.

Referring to FIG. 19, the soft grip head 1300 according to the present example embodiment includes a suction pad 1310, and the suction pad 1310 includes a sidewall 1320 and a plurality of suction cells 1330. The suction pad 1310 is divided by the sidewall 1320 to form the suction cells 1330. Here, the suction pad 1310 finally forms a body of the soft grip head 1300, and thus the suction pad 1310 is integrally formed and then the sidewall 1320 is also formed at the same time.

In the present example embodiment, an inside of the suction cell 1330 is not filled with a structure such as the flexible supporting part, and thus the inside thereof is open.

However, in the present example embodiment, since the structure such as the flexible supporting part is not filled or disposed, the suction pad 1310 includes a metamaterial having the stiffness along the axial direction A1 smaller than the stiffness along the width direction A2.

Here, since the sidewall 1320 is formed integrally with the suction pad 1310, the sidewall 1320 also includes the above mentioned metamaterial.

The metamaterial is defined as a material in which a meta atom is periodically arranged. Here, the meta atom is designed with a metal or a dielectric material formed to have a very small size smaller than a wavelength of a light, to perform characteristics not existing in a natural world.

In the present example embodiment, the suction pad 1310 includes the metamaterial to perform the characteristics of the suction pad 1310 having the stiffness along the width direction larger than that along the axial direction, and as illustrated in FIG. 19, the suction pad 1310 includes a first material layer 1311 and a second material layer 1312.

Here, the first material layer 1311 may be a plate shape, and extend flat along the width direction A2 of the suction cell 1330. The first material layer 1311 may be a plural spaced apart from each other along the axial direction A1 of the suction cell 1330. The first material layer 1311 may have a first stiffness.

In addition, the second material layer 1312 is disposed between the first material layers 1311 adjacent to each other, and may have a second stiffness. The second material layer 1312 may include a flexible polymer. Since the second material layer 1312 has the stiffness smaller than that of the first material layer 1311, the second material layer 1312 is compressed more easily compared to the first material layer 1311 when the soft grip head 1300 is compressed along the axial direction A1. Thus, the soft grip head 1300 may be compressed more easily along the axial direction A1.

However, since the stiffness of the first material layer 1311 is larger than that of the second material layer 1312, the transformation along the width direction A2 is relatively small when the soft grip head 1300 is compressed along the axial direction A1. Thus, the resisting force on the compressed transformation of the suction cell 1330 may be effectively provided.

Accordingly, except for the material of the sidewall 1320, the structure, the shape and so on of the sidewall 1320 and the suction cell 1330 are substantially same as those of the sidewall 111 and the suction cell 113.

Figure 20:
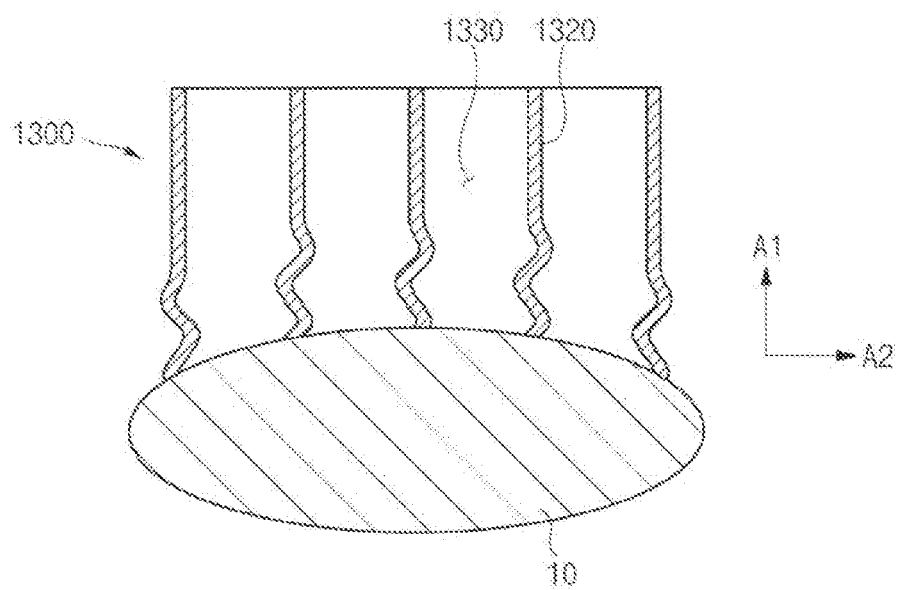
FIG. 20 is a cross-sectional view illustrating a gripping state on an object using the soft grip head of FIG. 19.

FIG. 20 is a cross-sectional view illustrating a gripping state on an object using the soft grip head of FIG. 19.

Referring to FIG. 20, as explained above, even though additional structure such as the flexible supporting part is not filled or disposed inside of the suction cell 1330, the soft grip head 1300 efficiently grips the object 10 with suction, since the stiffness along the width direction of the soft grip head 1300 is larger than the stiffness along the axial direction.

When the stiffness along the width direction is larger than the stiffness along the axial direction, the resisting force on the compressed transformation of the suction cell 1330 along the width direction is relatively large, and thus the transformation along the width direction A2 is maintained relatively smaller, even though the suction cell 1330 is compressed along the axial direction A1 in the gripping of the object 10.

Accordingly, the suction cell 1330 is prevented from being blocked, and the suction force is continuously generated through the suction cell 1330, so that the gripping for the object 10 with suction may be effectively improved.

Figure 21:
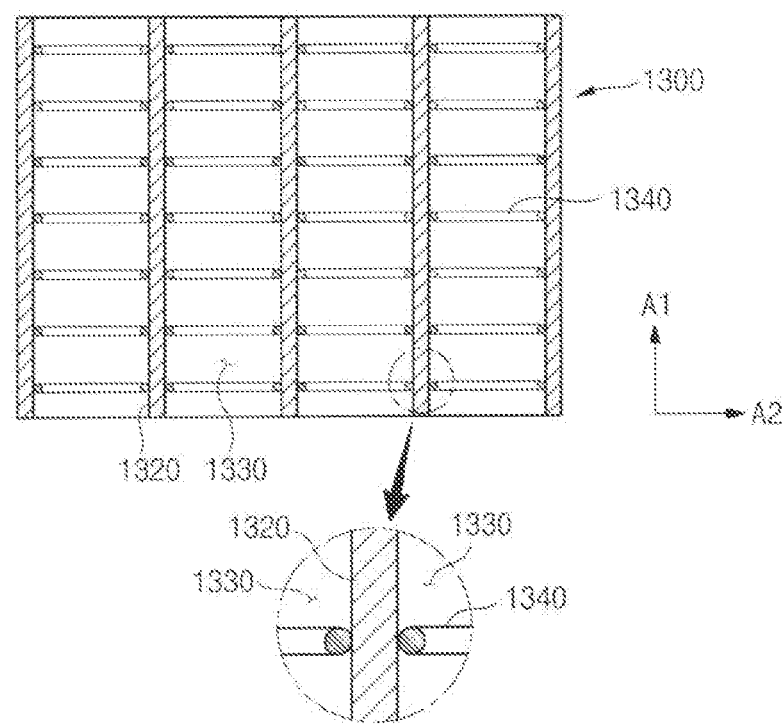
FIG. 21 is a cross-sectional view illustrating an example supporting part formed inside of a suction cell 1330, in the soft grip head of FIG. 19.

FIG. 21 is a cross-sectional view illustrating an example supporting part formed inside of a suction cell 1330, in the soft grip head of FIG. 19.

Referring to FIG. 21, a supporting part 1340 is formed inside of the suction cell 1330. The supporting part 1340 extends along the width direction A2 and a plurality of the supporting parts 1340 is spaced apart from each other along the axial direction A1.

The supporting part 1340 extends along a circumferential direction of the suction cell 1330, and is disposed inside of the suction cell 1330. Thus, the supporting part 1340 provides the resisting force on the compressed transformation along the width direction A2.

In addition, an outer surface of the supporting part 1340 makes contact with an inner surface of the suction cell 1330, which is the sidewall 1320, and thus the supporting part 1340 makes contact with an inner surface of the suction cell 1330.

In the figure, the supporting part 1340 is positioned with the same height in all suction cells 1330, but not limited thereto, and thus the supporting part 1340 may be positioned with different heights at every suction cell 1330.

Figure 22:
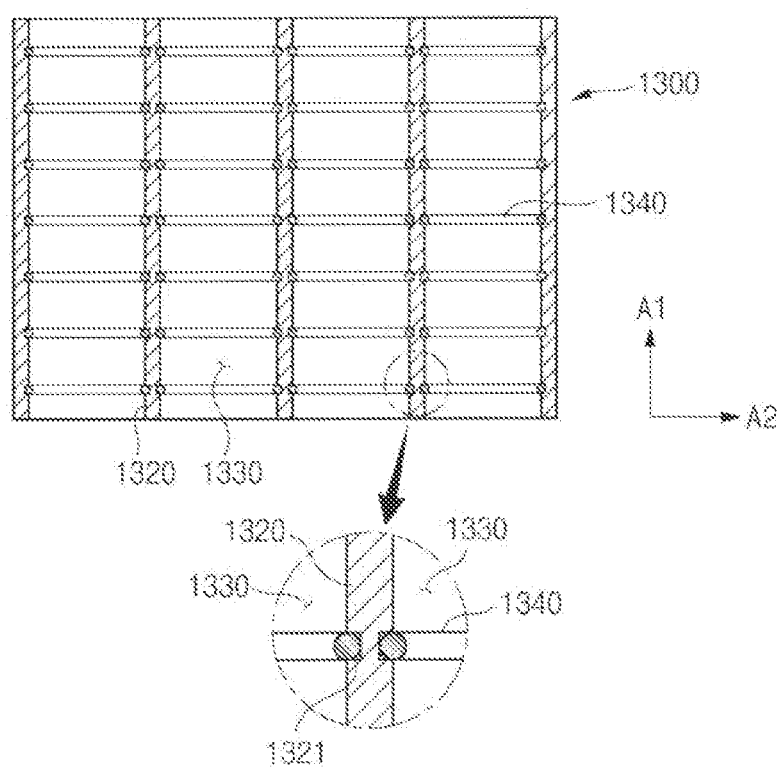
FIG. 22 is a cross-sectional view illustrating another example supporting part formed inside of a suction cell 1330, in the soft grip head of FIG. 19.

FIG. 22 is a cross-sectional view illustrating another example supporting part formed inside of a suction cell 1330, in the soft grip head of FIG. 19.

The supporting part 1340 in FIG. 22 is the same as in FIG. 21, except for a fixing state with the sidewall 1320.

Referring to FIG. 22, the supporting part 1340 formed inside of the suction cell 1330 is depressed into the inside of the sidewall 1320.

A groove 1321 is formed in the sidewall 1320, and an outer surface of the supporting part 1340 is inserted and mounted at the groove 1321. Thus, the supporting part 1340 may be positioned at the suction cell 1330 more stably.

Figure 23:
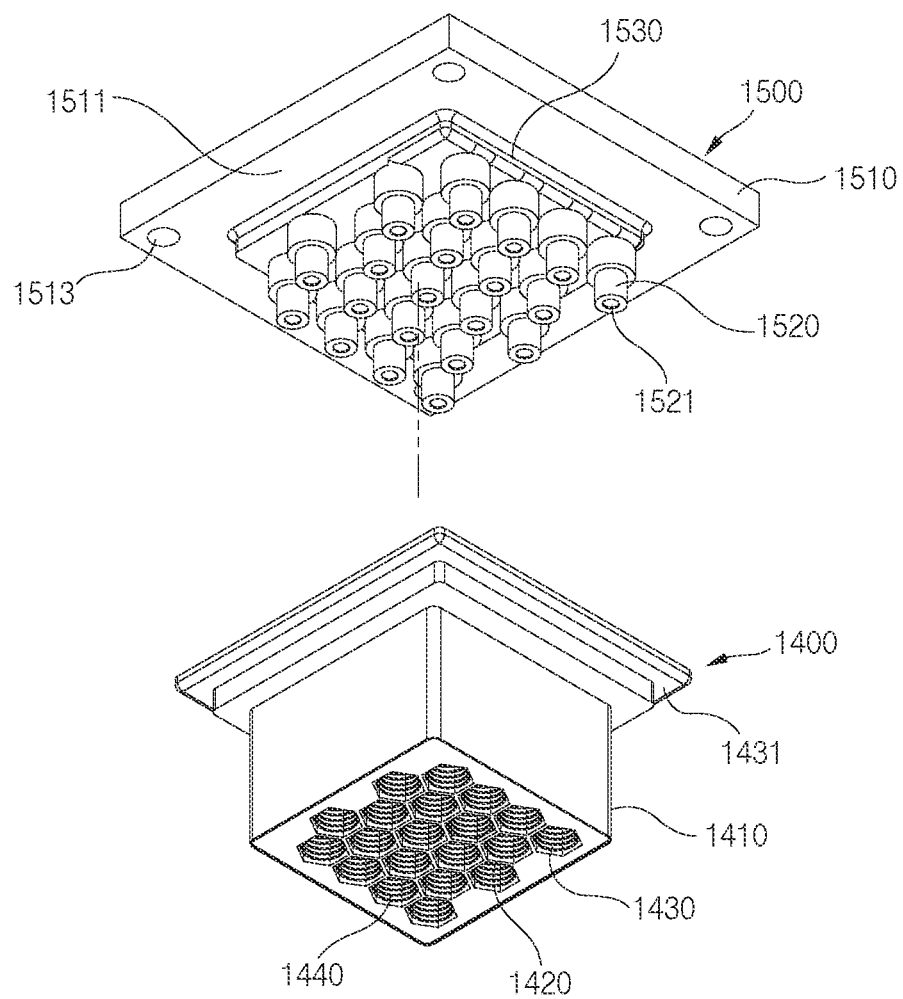
FIG. 23 is a perspective view illustrating a soft grip head according to still another example embodiment of the present invention, and a fixing cap combined with the soft grip head.

FIG. 23 is a perspective view illustrating a soft grip head according to still another example embodiment of the present invention, and a fixing cap combined with the soft grip head.

Referring to FIG. 23, the soft grip head 1400 according to the present example embodiment includes a suction pad 1410, a flexible supporting part 1440 and a flange 1431, and the fixing cap 1500 includes a base 1510 and a socket 1520. Here, a through hole 1521 is formed through the socket 1520.

Here, the suction pad 1410 includes a sidewall 1420, and a plurality of suction cells 1430, and the suction pad 1410 is divided by the sidewall 1420 to form the suction cells 1430.

The flexible supporting part 1440 is disposed inside of the suction cell 1430, as explained above.

In addition, in the present example embodiment, the structure, the material, the shape and so on of the sidewall 1420 and the suction cell 1430 are substantially same as those of the sidewall 111 and the suction cell 113 in FIG. 1.

Further, the flexible supporting part 1440 has a stiffness along the axial direction A1 smaller than a stiffness along the width direction A2, and the flexible supporting part 1440 may be a coil spring partially making contact with an inner surface of the suction cell 1430, as explained above.

However, in the present example embodiment, the flange 1431 is disposed over the suction pad 1410, and the flange 1431 is combined with the base 1510.

The base 1510 of the fixing cap 1500 is combined with the flange 1431, and thus the fixing cap 1500 and the soft grip head 1400 are combined with each other.

A plurality of the sockets 1520 is protruded from the base 1510, and the position and the arrangement of the sockets 1520 are substantially same as those of the suction cells 1430.

Thus, when the fixing cap 1500 and the soft grip head 1400 are combined with each other, each of the sockets 1520 is inserted into the suction cell 1430.

Here, the diameter of the socket 1520 may be larger than the inner diameter of the suction cell 1430. The sidewall 1420 forming the suction cell 1430 includes a flexible material and is stretchable, and thus the socket 1520 and the suction cell 1430 are combined with each other more stably when the diameter of the socket 1520 is larger than the inner diameter of the suction cell 1430. In addition, the air may be prevented from being leaked.

The fixing cap 1500 includes a protrusion 1530, and the protrusion 1530 is combined with a mounting groove formed on an upper surface of the flange 1431, although not shown in the figure. Thus, the fixing cap 1500 and the soft grip head 1400 are combined with each other more stably, and the suction air may be prevented from being leaked.

Figure 24A:
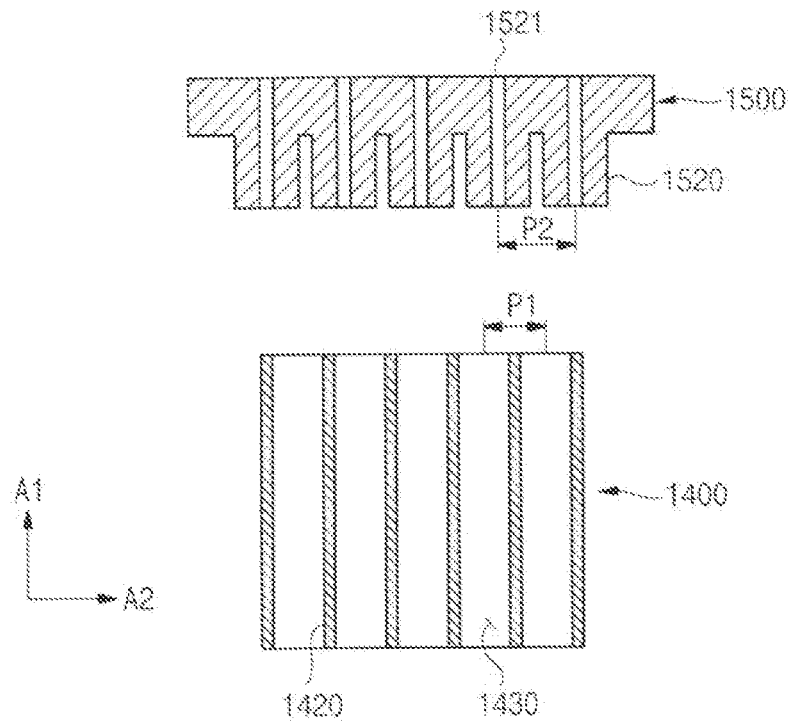
FIG. 24A is a cross-sectional view illustrating the soft grip head and the fixing cap of FIG. 23.
Figure 24B:
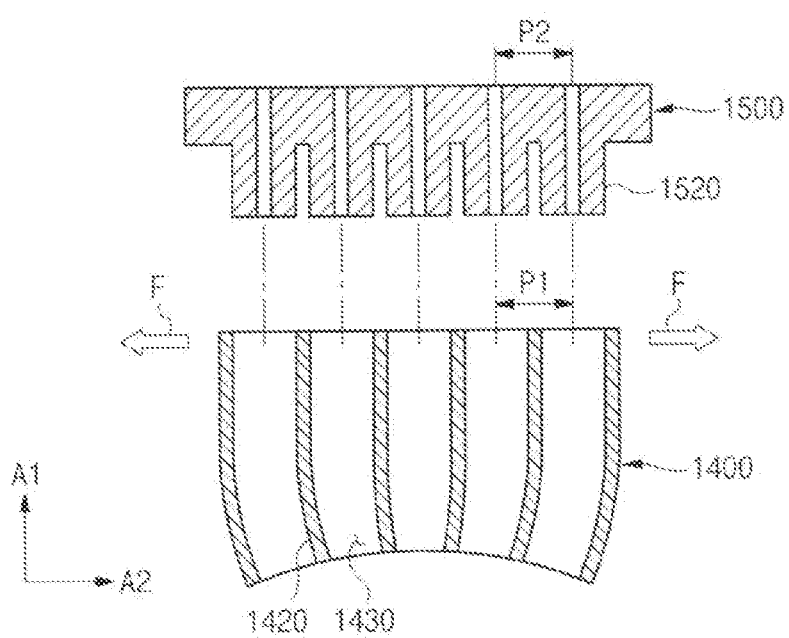
FIG. 24B is a cross-sectional view illustrating a combined state of the soft grip head and the fixing cap of FIG. 23.

FIG. 24A is a cross-sectional view illustrating the soft grip head and the fixing cap of FIG. 23, and FIG. 24B is a cross-sectional view illustrating a combined state of the soft grip head and the fixing cap of FIG. 23.

As illustrated in FIG. 24A, a distance P1 (first distance) between the centers of the suction cells 1430 adjacent to each other, is smaller than a distance P2 (second distance) between the centers of the sockets 1520 adjacent to each other.

Accordingly, as illustrated in FIG. 24B, when the fixing cap 1500 is combined with the soft grip head 1400, a force F is applied at an upper portion of the soft grip head 1400 to increase the first distance P1. Then, the socket 1520 is positioned inside of the suction cell 1430.

Then, the applied force F is removed, the first distance P1 is restored and the socket 1520 and the suction cell 1430 are fixed with each other more tightly.

Figure 25A:
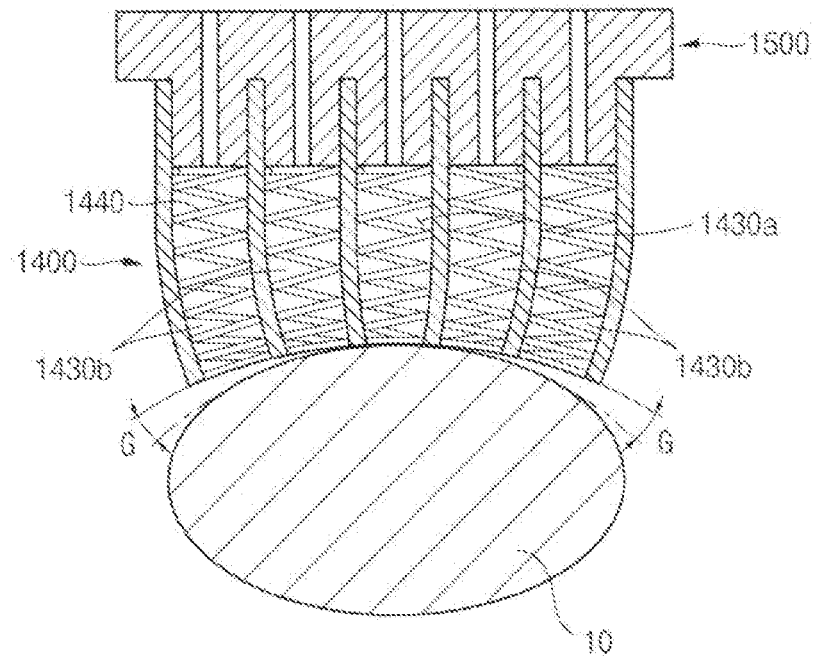
FIG. 25A and FIG. 25B are cross-sectional views illustrating a gripping state on an object using the soft grip head of FIG. 23.
Figure 25B:
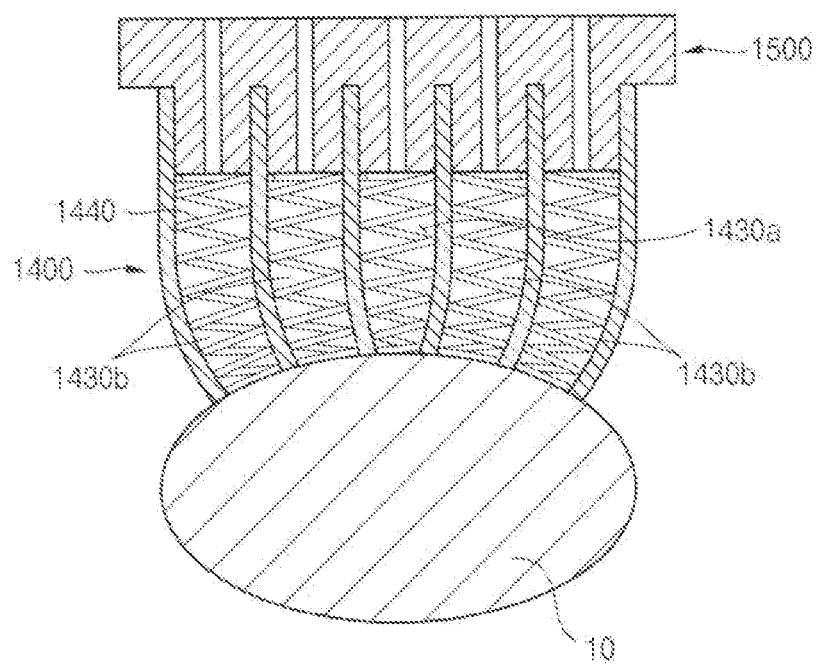

FIG. 25A and FIG. 25B are cross-sectional views illustrating a gripping state on an object using the soft grip head of FIG. 23.

As illustrated in FIG. 24B, when the soft grip head 1400 and the fixing cap 1500 are combined with each other, as illustrated in FIG. 25A, the upper portion of the soft grip head 1400 which is a portion connected to the fixing cap 1500 is elongated, and thus a cross-sectional area of the soft grip head 1400 decreases as the soft grip head goes toward the object 10.

That is, the soft grip head 1400 may have an effect of a suction cup.

Thus, as illustrated in FIG. 25A, when the object 10 has a round shape such as a circular shape or an elliptical shape, a gap G between the soft grip head 1400 and the object 10 may be maintained to be relatively small, in case that the object 10 makes contact with the soft grip head 1400.

Since the end of the soft grip head 1400 is entirely concaved, the suction cell 1430a positioned at a center may be easily adhered to the object 10, but the suction cell 1430b positioned at an edge may be less adhered to the object 10. However, the gap G may be maintained to be relatively small.

Then, as illustrated in FIG. 25B, when the suction force is generated inside of the suction cell 1430, the suction cell 1430b positioned at the edge may be adhered to the object 10 more tightly, and then the object 10 may be entirely enclosed by the suction cell 1430. The contact area between the object 10 and the suction cell 1430 is increased, and thus the gripping on the object 10 may be performed more efficiently.

Here, the resisting force on the compressed transformation along the width direction due to the flexible supporting part 1440 inside of the suction cell 1430 is maintained, and thus the suction cells 1430 are prevented from being narrowed excessively and the object 10 is gripped more stably.

Figure 26:
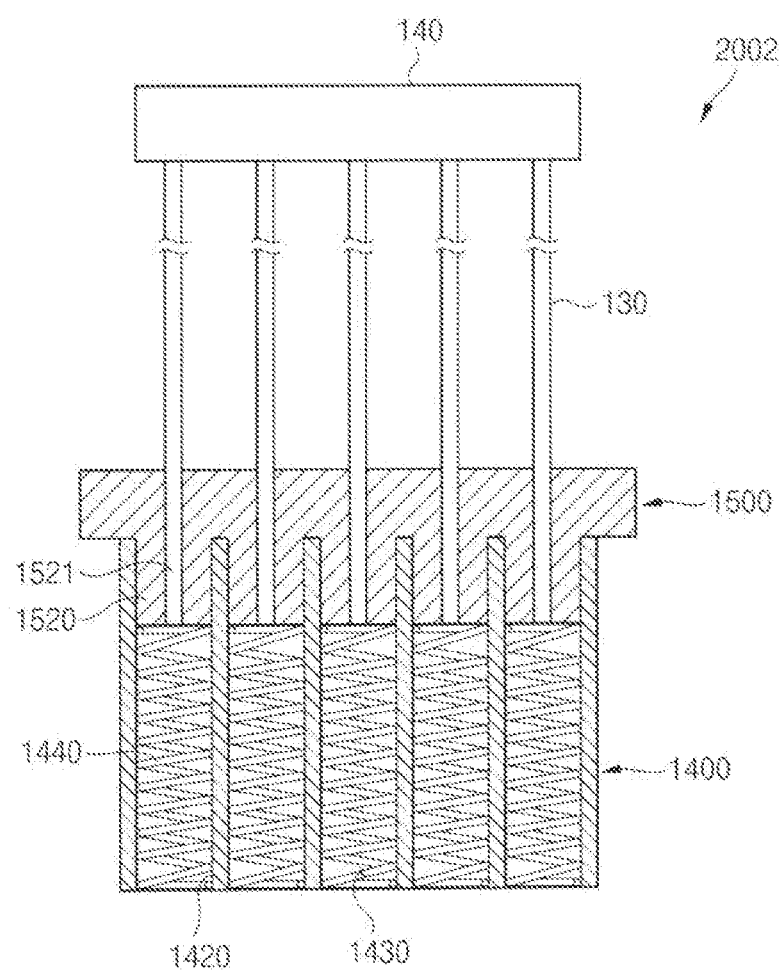
FIG. 26 is a cross-sectional view illustrating a soft grip unit having the soft grip head of FIG. 23.

FIG. 26 is a cross-sectional view illustrating a soft grip unit having the soft grip head of FIG. 23.

Referring to FIG. 26, the soft grip head 1400 according to the present example embodiment forms the soft grip head 2002, with the fixing cap 1500 combined at an upper portion of the soft grip head 1400, the connecting line 130 connected with the soft grip head 1400 through the fixing cap 1500, and the suction force generating part 140 providing the suction force to the connecting line 130.

Here, a first end of the connecting line 130 is connected to the through hole 1521 formed through the socket 1520 of the fixing cap 1500, and a second end of the connecting line 130 is connected to the suction force generating part 140.

At a portion of the connecting line 130 connected to the through hole 1521, the check valve 150 explained referring to FIG. 7 may be configured, and any repetitive explanation will be omitted. Further, as explained above, the suction force generating part 140 generates the suction force to each of the suction cells 1430 through the connecting line 130.

According to the present example embodiments, in the soft grip head, the plurality of the suction cells is divided by the sidewall, and each of the suction cells has the stiffness along the axial direction smaller than that along the width direction, so that an opening of the suction cells is prevented from being blocked and an attaching area is increased in the gripping with suction. Thus, the gripping may be more efficient.

Here, the material of the soft grip head is maintained to have the stiffness along the width direction more largely, or the flexible supporting part is filled or disposed inside of the suction cells, so that the shape of the suction cells is properly maintained and the suction force is properly provided in the gripping with suction.

Further, the soft grip unit is configured to have the soft grip head and the components providing the suction force, and various kinds of soft grip devices may be designed for gripping the object having various shapes more efficiently.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A soft grip head having a suction pad, the sucking pad making contact with an object, wherein the suction pad comprises:
   a sidewall dividing the suction pad into a plurality of spaces, both ends of each of the spaces being open; and
   a plurality of suction cells respectively formed by the spaces divided by the sidewall,
   wherein the suction pad comprises a material having a stiffness along an axial direction smaller than a stiffness along a width direction,
   wherein the suction cells extend along the axial direction, and the width direction is substantially perpendicular to the axial direction, and
   wherein a plurality of supporting parts fixed inside of each of the suction cells by a predetermined distance, along a circumferential direction of the suction cells.

2. The soft grip head of claim 1, wherein the suction pad further comprises:
   a first material layer having a first stiffness, and extending along the width direction of the suction cells; and
   a second material layer having a second stiffness smaller than the first stiffness.

3. The soft grip head of claim 2, wherein a plurality of the first material layers is spaced apart from each other by a predetermined distance along the width direction of the suction cells,
   wherein a plurality of the second material layers is disposed between the first material layers adjacent to each other.

4. A soft grip head comprising:
   a suction pad having a sidewall dividing the suction pad into a plurality of spaces, and a plurality of suction cells respectively formed by the spaces divided by the sidewall, wherein both ends of each of the spaces are open; and
   a flexible supporting part disposed in the spaces of the suction cells, wherein a stiffness of the flexible supporting part along an axial direction is smaller than a stiffness along a width direction, wherein the suction cells extend along the axial direction and the width direction is substantially perpendicular to the axial direction,
   wherein a shape of the suction pad changes to grip an object with suction, in response to a suction force being applied into the spaces of the suction cells,
   wherein the flexible supporting part is filled or disposed inside of each of the suction cells, the flexible supporting part is changed with the change of the shape of the suction pad, and an air passes through the flexible supporting part, and
   wherein the flexible supporting part comprises a sponge or a porous structure.

5. The soft grip head of claim 4, wherein a first end of the flexible supporting part is spaced apart from an inlet of the suction cell by a predetermined distance.

6. The soft grip head of claim 5, wherein a stopper is disposed at each suction cell, and the stopper is protruded from an inner surface of the suction cell to prevent the first end of the flexible supporting part from moving into the inlet of the suction cell.

7. The soft grip head of claim 4, wherein the suction pad further comprises a plurality of inner bodies, and each of the inner bodies continuously extends from each of the suction cells and is open,
   wherein a cross-sectional area of each of the inner bodies is smaller than that of each of the suction cells.

8. The soft grip head of claim 7, wherein the flexible supporting part extends from the space of the suction cell toward an inner space of the inner body.

9. The soft grip head of claim 7, wherein a width of a cross-section of the suction cell decreases as the suction cell goes toward the inner body.

10. The soft grip head of claim 4, wherein a cross-sectional shape of the suction cell along the width direction, is one of a triangle, a rectangular, a pentagon, a hexagon and a polygon.

11. The soft grip head of claim 4, further comprising:
a block part formed along an outline of the suction cells, and changes a stiffness of the suction pad; and
a pressure control part configured to control a negative pressure inside of the block part.

12. The soft grip head of claim 11, wherein particles are filled inside of the block part,
wherein adhesion between the particles increases to increase a stiffness of the block part, as the pressure control part provides the negative pressure inside of the block part.

13. A soft grip unit comprising:
a soft grip head;
a fixing cap configured to support the soft grip head;
a suction force generating part configured to provide a suction force to the soft grip head; and
a connecting line configured to connect the suction force generating part with the fixing cap,
wherein the soft grip head comprises:
a suction pad having a sidewall dividing the suction pad into a plurality of spaces, and a plurality of suction cells respectively formed by the spaces divided by the sidewall, wherein both ends of each of the spaces are open; and
a flexible supporting part disposed in the spaces of the suction cells, wherein a stiffness of the flexible supporting part along an axial direction is smaller than a stiffness along a width direction, wherein the suction cells extend along the axial direction and the width direction is substantially perpendicular to the axial direction,
wherein a shape of the suction pad changes to grip an object with suction, in response to a suction force being applied into the spaces of the suction cells,
wherein the fixing cap comprises a through hole connected to each of the suction cells, and
wherein a distance between centers of the suction cells adjacent to each other is smaller than a distance between the through holes adjacent to each other.

14. The soft grip unit of claim 13, further comprising a check valve configured to the connecting line to open or close the connecting line.

15. The soft grip unit of claim 13, wherein the flexible supporting part comprises a coil spring making contact with an inner surface of each of the suction cells.

16. A grip device comprising:
a body;
a connecting part extending from the body toward an outside;
the soft grip unit of claim 13 disposed at a first end of the connecting part;
at least one arm extending from the body toward an outside of the soft grip unit; and
a holding part connected to an end of the arm, to fix an object with the soft grip unit.

* * * * *